MULTIPLYING ARRANGEMENTS FOR DIGITAL COMPUTING MACHINES

Filed Jan. 29, 1953 10 Sheets-Sheet 1

INVENTORS
Frederic Calland Williams,
Tom Kilburn and
Arthur Alexander Robinson
BY Stevens, Davis, Miller and Mosher
ATTORNEYS June 30, 1959 F. C. WILLIAMS ET AL 2,892,588

MULTIPLYING ARRANGEMENTS FOR DIGITAL COMPUTING MACHINES

Filed Jan. 29, 1953 10 Sheets-Sheet 2

INVENTORS

Frederic Calland Williams
Tom Kilburn and
Arthur Alexander Robinson

BY Stevens, Davis, Miller and Mosher
ATTORNEYS

June 30, 1959 F. C. WILLIAMS ET AL 2,892,588

MULTIPLYING ARRANGEMENTS FOR DIGITAL COMPUTING MACHINES

Filed Jan. 29, 1953 10 Sheets-Sheet 3

INVENTORS
Frederic Calland Williams,
Tom Kilburn and
Arthur Alexander Robinson
BY Stevens, Davis, Miller and Mosher
ATTORNEYS INVENTORS
Frederic Calland Williams,
Tom Kilburn and
Arthur Alexander Robinson
BY Stevens, Davis, Miller and Mosher
ATTORNEYS INVENTORS,
Frederic Calland Williams,
Tom Kilburn and
Arthur Alexander Robinson
BY Stevens, Davis, Miller and Mosher,
ATTORNEYS June 30, 1959 F. C. WILLIAMS ET AL 2,892,588

MULTIPLYING ARRANGEMENTS FOR DIGITAL COMPUTING MACHINES

Filed Jan. 29, 1953 10 Sheets-Sheet 6

INVENTORS,
Frederic Calland Williams,
Tom Kilburn and
Arthur Alexander Robinson
BY Stevens, Davis, Miller and Mosher
ATTORNEYS

MULTIPLYING ARRANGEMENTS FOR DIGITAL COMPUTING MACHINES

Filed Jan. 29, 1953 10 Sheets-Sheet 7

INVENTORS,
Frederic Calland Williams,
Tom Kilburn and
Arthur Alexander Robinson
BY Stevens, Davis, Miller and Mosher
ATTORNEYS INVENTORS.
Frederic Calland Williams,
Tom Kilburn and
Arthur Alexander Robinson
BY Stevens, Davis, Miller and Mosher
ATTORNEYS INVENTORS.
Frederic Calland Williams,
Tom Kilburn and
Arthur Alexander Robinson BY Stevens, Davis, Miller & Mosher,
ATTORNEYS INVENTORS,
Frederic Calland Williams,
Tom Kilburn and
Arthur Alexander Robinson
BY Stevens, Davis, Miller and Mosher
ATTORNEYS

United States Patent Office 2,892,588

Patented June 30, 1959

2,892,588

MULTIPLYING ARRANGEMENTS FOR DIGITAL COMPUTING MACHINES

Frederic Calland Williams, Timperley, Tom Kilburn, Davyhulme, Manchester, and Arthur Alexander Robinson, Scunthorpe, England, assignors, by mesne assignments, to International Business Machines Corporation, New York, N.Y., a corporation of New York Application January 29, 1953, Serial No. 333,908

Claims priority, application Great Britain January 31, 1952

16 Claims. (Cl. 235—166)

This invention relates to arrangements for performing a process of multiplication with two binary numbers, each represented as electric signals and is more particularly concerned with arrangements in which at least one of the numbers involved is represented dynamically in the serial mode as a pulse signal train.

In the binary notation of numbers, particularly in connection with the use of such notation in digital computing machines, use is made of both the so-called "unsigned" and the "signed" or "complement" notations. In the unsigned notation the number is interpreted by adding the values of all of its digits, thus 1011 represents $1.2^3+0.2^2+1.2^1+1.2^0$ or $8+2+1=11$ (in the decimal scale). Only positive numbers can be represented in this way. In the signed notation the value of the most significant or left-hand digit is subtracted from the sum of the values of the remainder of the digits. Both positive and negative numbers can be represented in this notation. Thus 01011 represents 11 as before but 11011 represents $-16+8+2+1$ or $-5$. Minus 11 would be represented by 10101 or $-16+4+1$. Conversion of a binary number to its complement, it will be observed, is effected by reversing the significance of each digit after the first "1" digit proceeding from the lowest significant end of the number.

If an unsigned number is required to be extended in the direction of increased significance from, say, five digits length to ten digits length, this may be effected by adding the requisite number of 0's at the left-hand end. Thus 01011 extended to ten digits becomes 0000001011. In the case of a signed number, however, it is necessary to repeat the left-hand digit of the original number, thus 01011 becomes 0000001011 but 11011 becomes 1111111011.

The use of such signed or complement notation permits, provided the two numbers involved have the same number of digits, addition and subtraction to be carried out by exactly the same methods with both signed and unsigned numbers if the units carried from or borrowed by the most significant digit are ignored. Multiplication however necessitates the taking into account of the sign conventions of the factors.

The following is an example of binary multiplication of two unsigned numbers:

| | | | |
|---|---|---|---|
| | | 1011------ | $R$ (11) |
| | | 0101------ | $D$ (5) $=\sum_{K=0}^{K=3} Rd_K.2^K$ |
| | 0000 | 1011------ | $Rd_0 2^0$ |
| (0) | 0000 | 000------- | $Rd_1 2^1$ |
| (00) | 0010 | 11-------- | $Rd_2 2^2$ |
| (000) | 0000 | 0--------- | $Rd_3 2^3$ |
| (000) | 0011 | 0111------ | $RD(32+16+4+2+1=55)$ |

It will be seen that three processes are involved, namely:

(1) The factor R is multiplied separately by each digit $d_K$ of the factor D.

(2) The minor-products $Rd_K$ are each multiplied by $2^K$ and extended.

(3) The partial-products $Rd_K 2^K$ are added to form the final product.

The extension of each of the partial-products $Rd_K 2^K$ to twice the initial number length, i.e. eight digits, is effected by adding 0's since neither R nor D is signed.

With multiplication involving signed numbers it is necessary to extend each of the partial-products $Rd_K 2^K$ by repeating the most significant digits if the factor R is signed. Again if D is signed the last partial-product $Rd_3 2^3$ must be reversed in sign or complemented before being added since the most significant digit of the factor D has negative significance.

The following is an example of binary multiplication of two signed numbers.

| | | | |
|---|---|---|---|
| | | 11011-- | $R$ (−5) |
| | | 10101-- | $D\ (-11)=\sum_{K=0}^{K=3} Rd_K 2^K - d_4 2^4$ |
| | 11111 | 11011-- | $Rd_0 2^0$ |
| | 00000 | 0000--- | $Rd_1 2^1$ |
| | 11111 | 011---- | $Rd_2 2^2$ |
| | 00000 | 00----- | $Rd_3 2^3$ |
| | 00010 | 1------ | $-Rd_4 2^4$ |
| (10) | 00001 | 10111-- | $RD=(32+16+4+2+1=55)$ |

Among the objects of the present invention are included, the provision of an improved arrangement which is capable of dealing with factor numbers whose total number of digits is greater than that present in the normal basic length of so-called "word" which can be expressed dynamically in the serial mode in one minor cycle or beat of the machine rhythm, and the provision of a device which is capable, under the control of a suitable instruction, of operating with either signed or unsigned numbers.

In accordance with one feature of the invention a multiplying arrangement for an electronic digital computing machine includes a subsidiary number storage device and means by which either the whole or a part of one or both of the factor numbers may be retained therein and withdrawn in sections of predetermined digit length during the multiplication operation to permit the multiplication, in sections, of two numbers at least one of which has a total number of digits which is greater than that which can be handled at one time by the multiplying arrangements provided in the machine.

According to another feature of the invention a multiplying arrangement for an electronic digital computing machine comprises a plurality of serially connected adding devices each supplied with the digits of one factor number through individual gating means controlled by the different digits of the other number as described, for instance, in copending application No. 132,579, filed December 12, 1949, by Arthur A. Robinson (now U.S.A. Patent No. 2,685,407), and includes means by which said gating means may first be controlled according to the respective digit values of an equivalent number of the successive digits of a first factor number whose total number of digits is greater than the number of said gating means and adding devices whilst the whole of the digits of the other factor number are applied thereto to obtain a first partial-product and by which said gating means may subsequently be controlled according to the respective digit values of a further selection of successive digits of said first factor number whilst the whole of the digits of said other factor number are again applied thereto to obtain a second partial-product. In a preferred embodiment the partial-products are combined to form a final product in an accumulator device.

According to a further feature means are provided for effecting extension of one of the factor numbers in accordance with the use of either unsigned or signed convention together with means for effecting complementing of such factor number where necessary under the control of an appropriate instruction.

In order that the above and still further features of the invention may be more readily understood a practical embodiment of the invention will now be more particularly described with reference to the accompanying drawings in which.

Figure 10A:
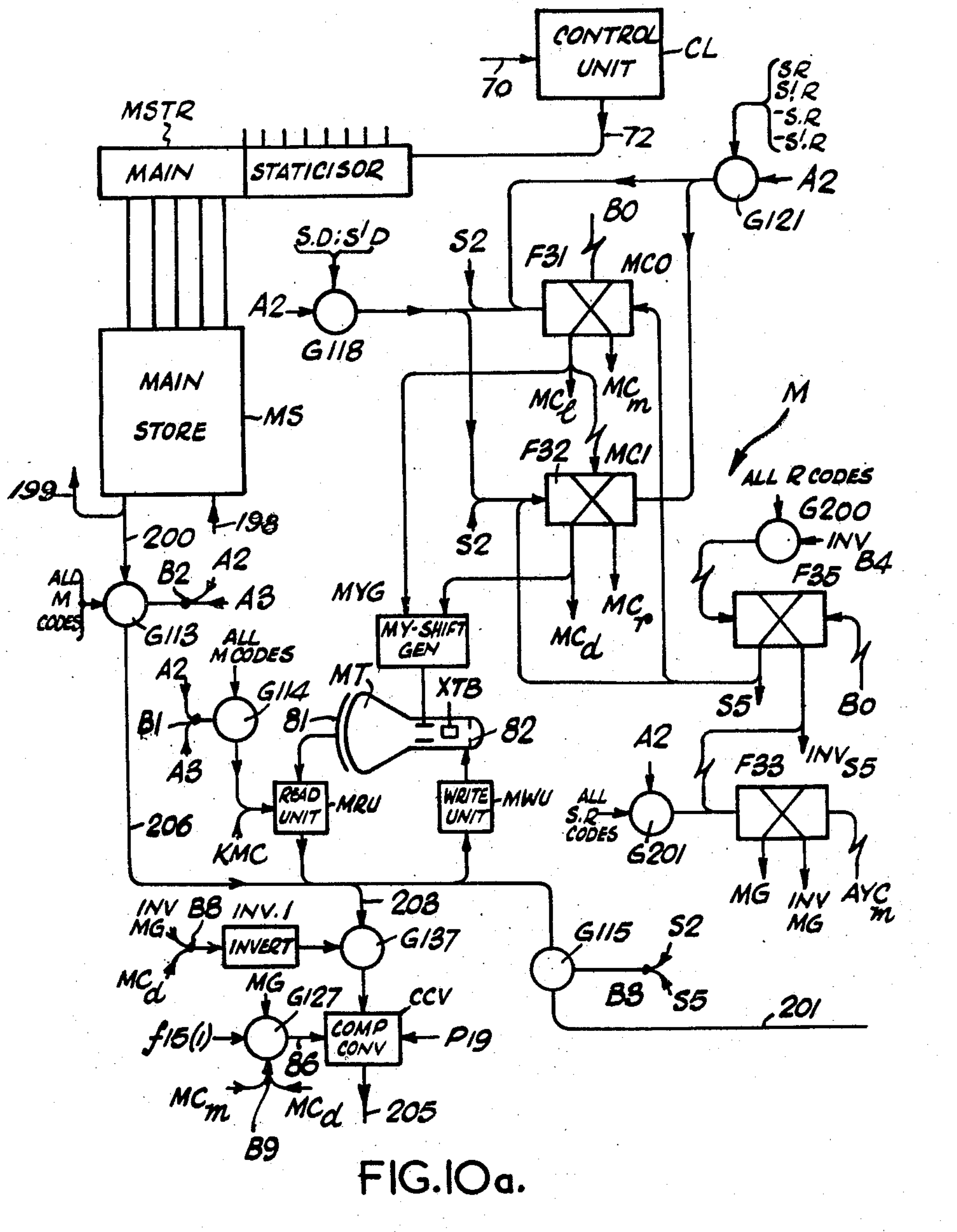
Figure 10B:
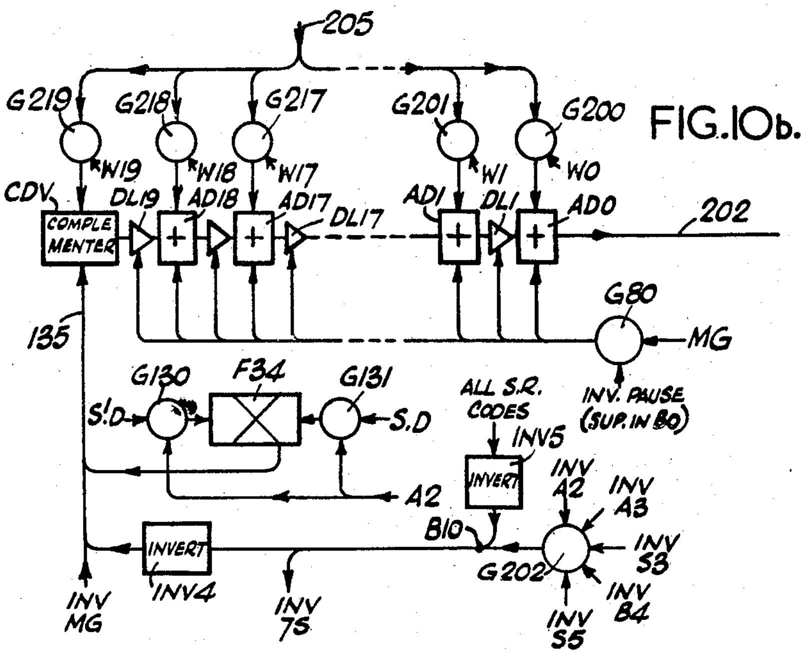
Figure 10C:
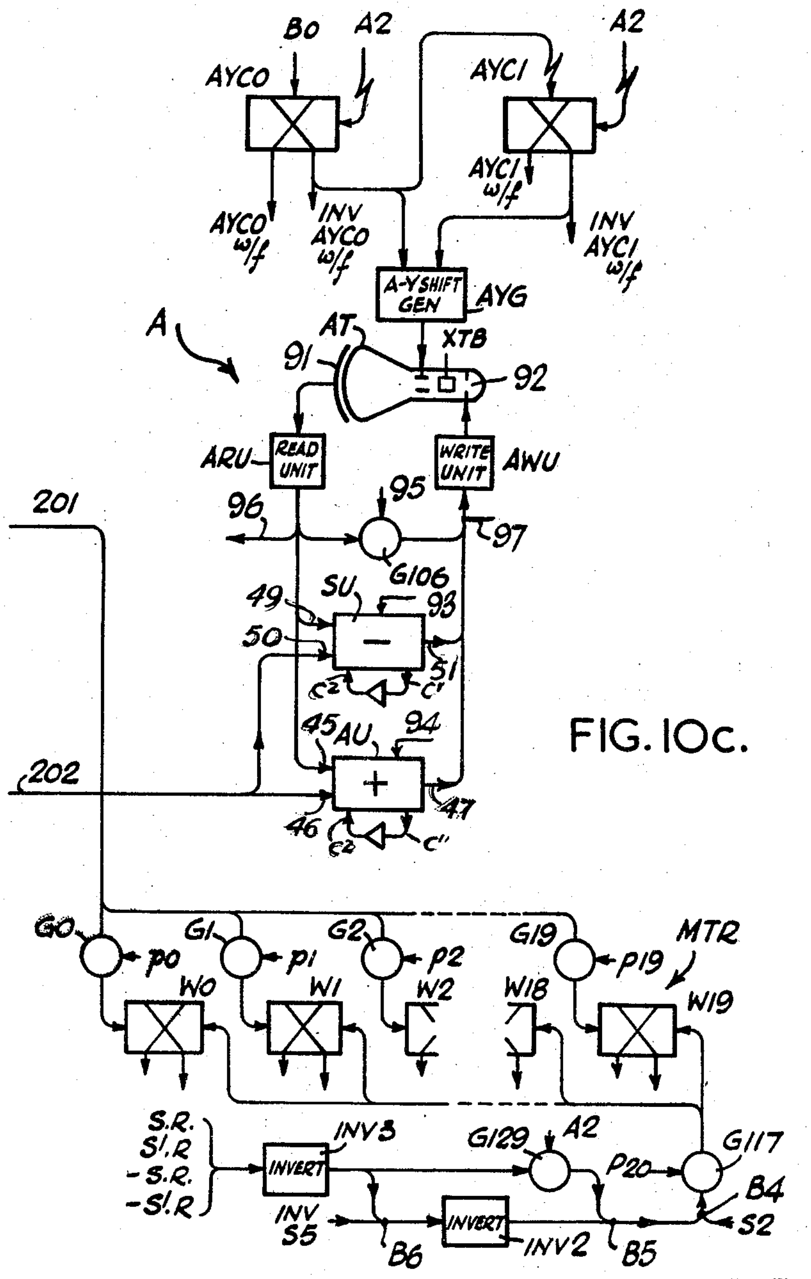

Figures 10*a*, 10*b* and 10*c* collectively provide a detailed schematic drawing of the multiplier arrangements.

Figure 11:
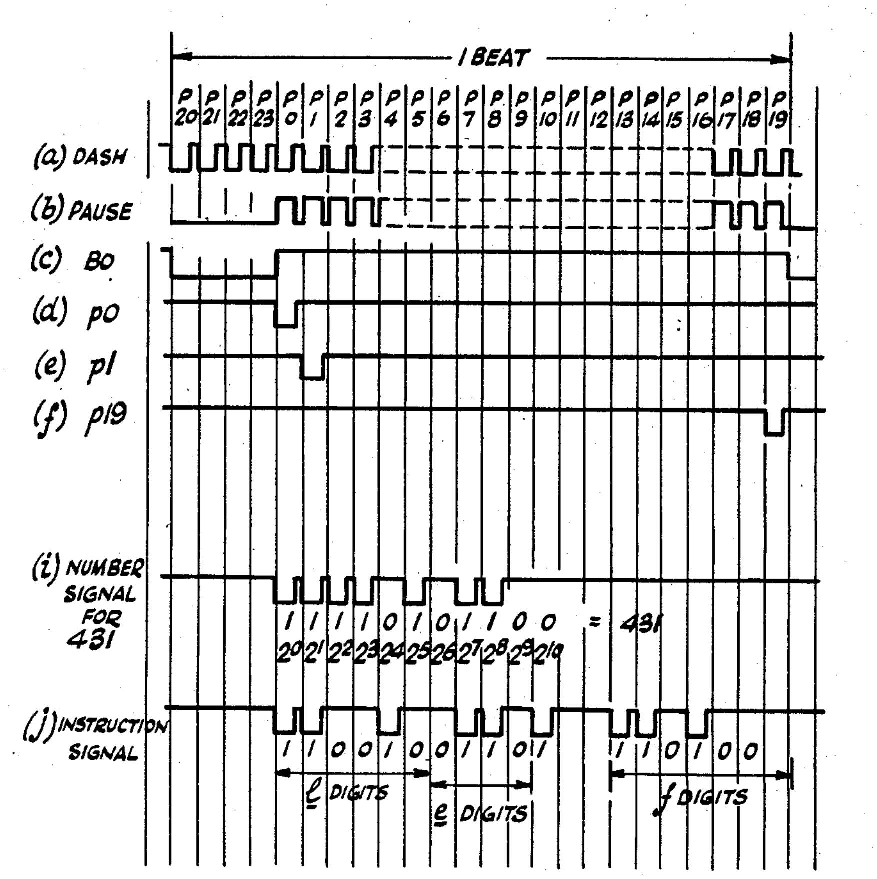
Figure 12:
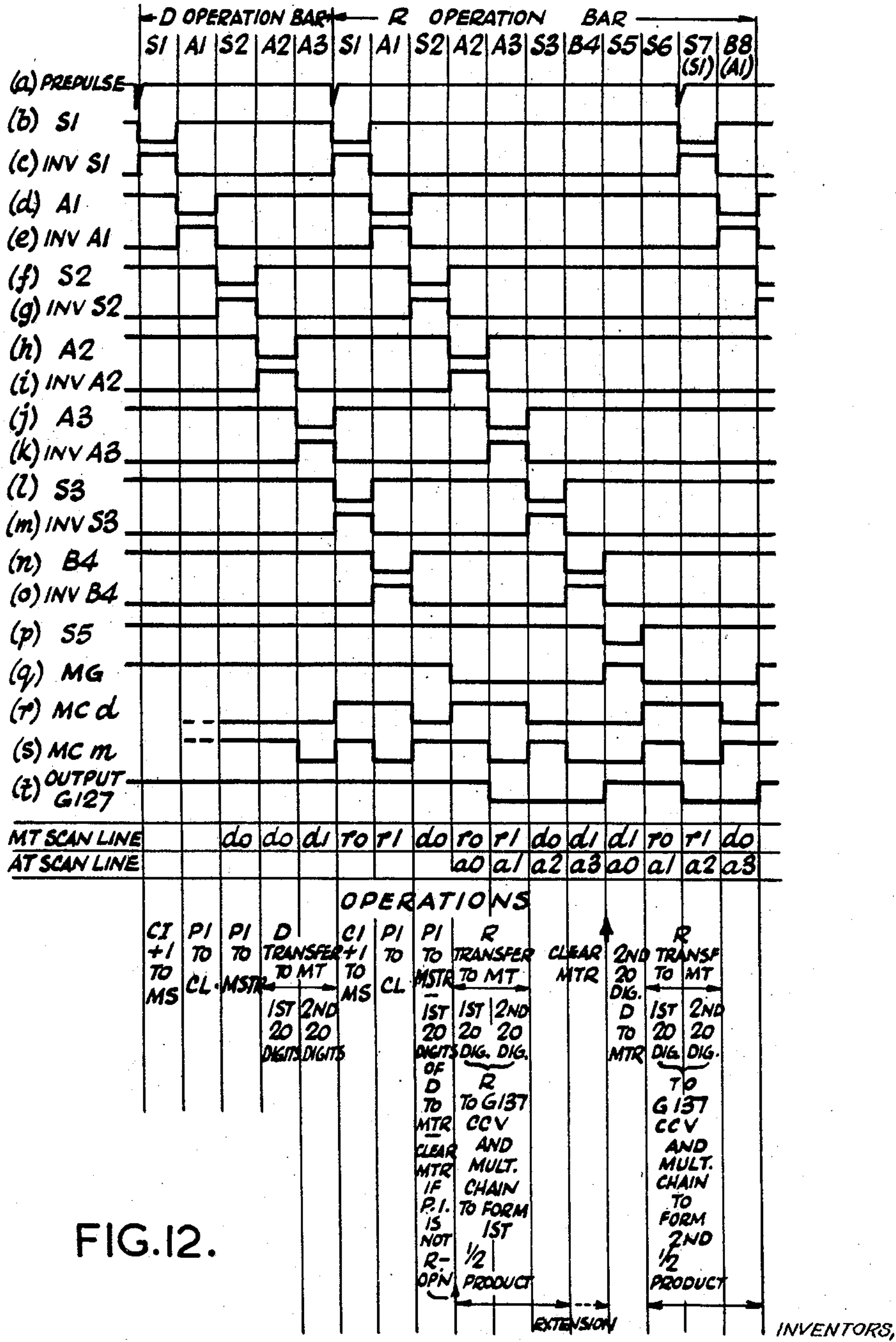

Figures 11 and 12 each comprise a series of diagrams showing various electric waveforms used in the machine and concerned with the operation of the multiplier, Fig. 12 including also a table illustrating the timing of the various operative steps of a multiplying operation.

Figure 13:
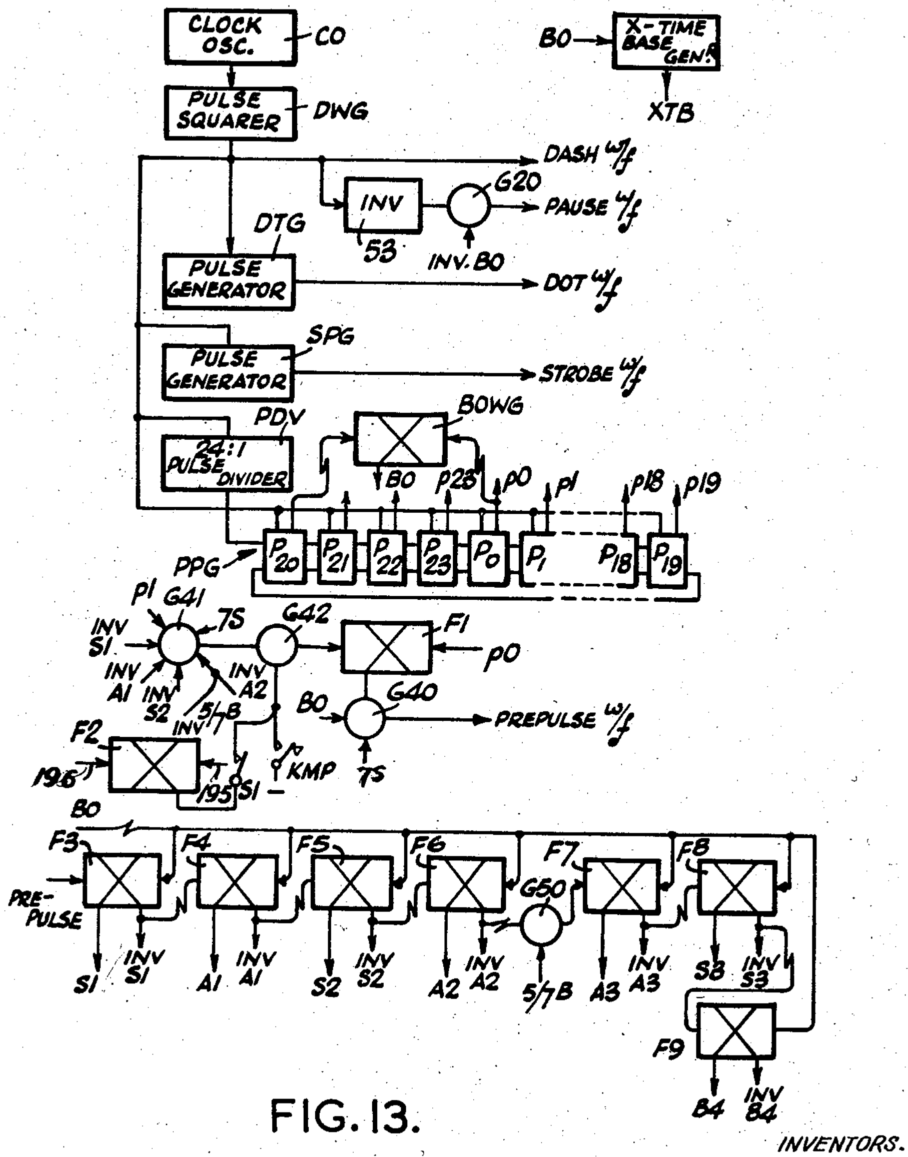

Figure 13 illustrates schematically the principal components of the waveform generator WGU of the machine so far as they are concerned with multiplication.

Figure 14:
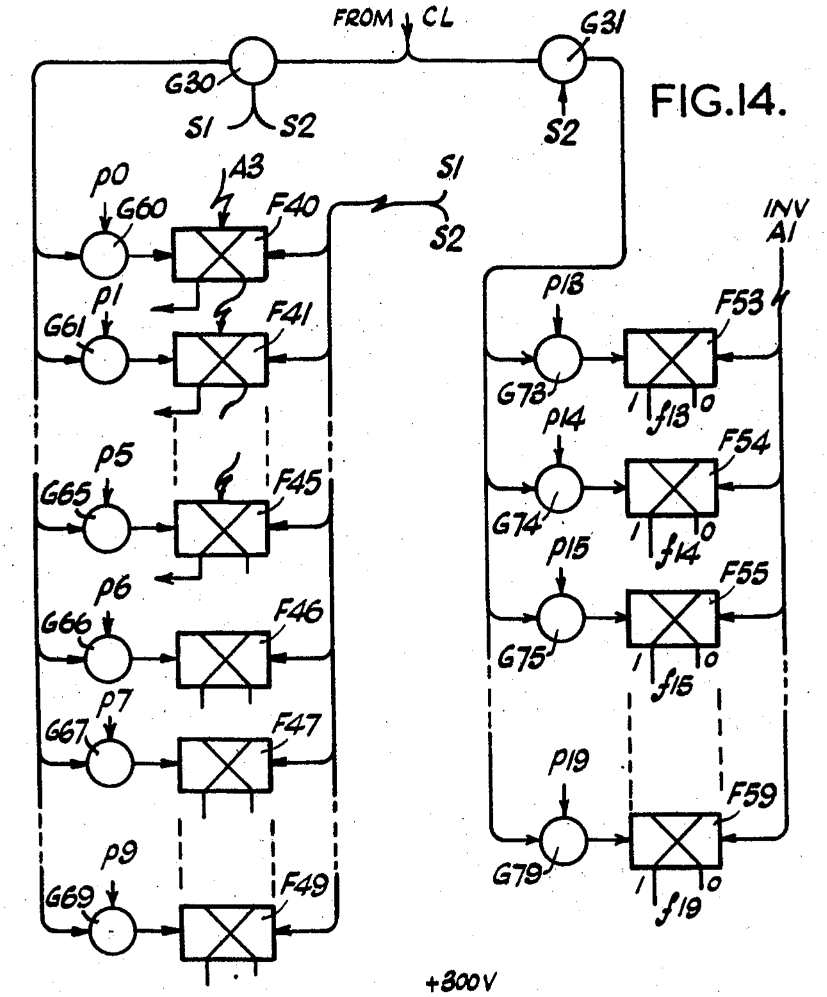

Figure 14 is a schematic view, similar to Fig. 13, of the principal elements of the main staticisor MSTR so far as they are concerned with multiplication.

Figure 15:
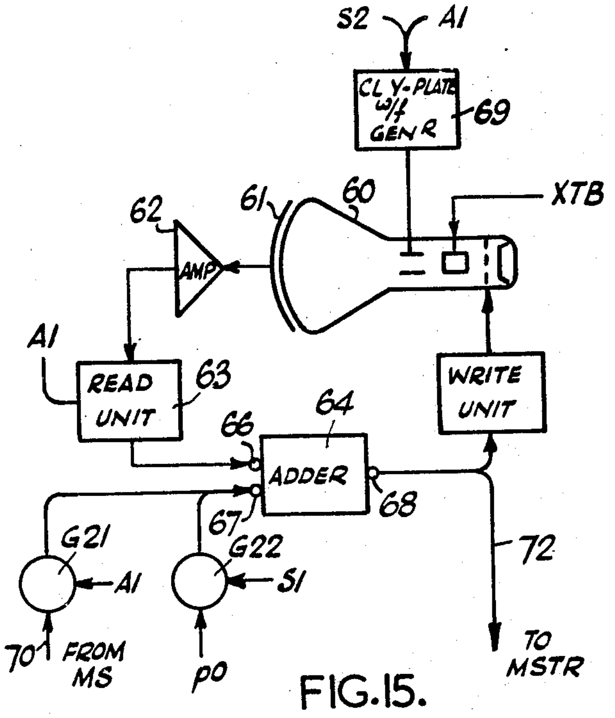

Figure 15 is a schematic view, similar to Fig. 13, of the principal elements of the control CL so far as they are concerned with multiplication.

Figure 16:
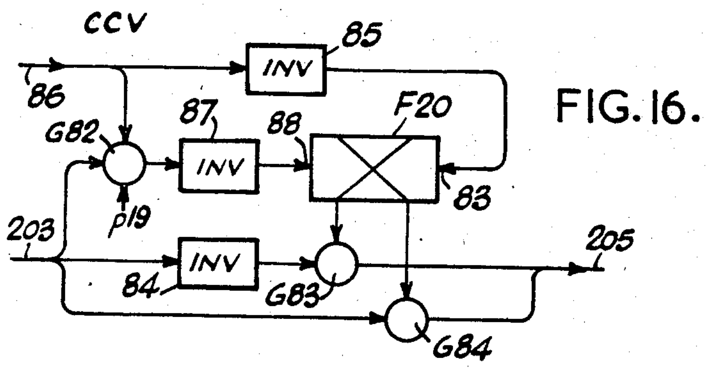

Figure 16 is a more detailed schematic diagram of the arrangements forming the complement converter CCV of Fig. 10*a*.

Figure 17:
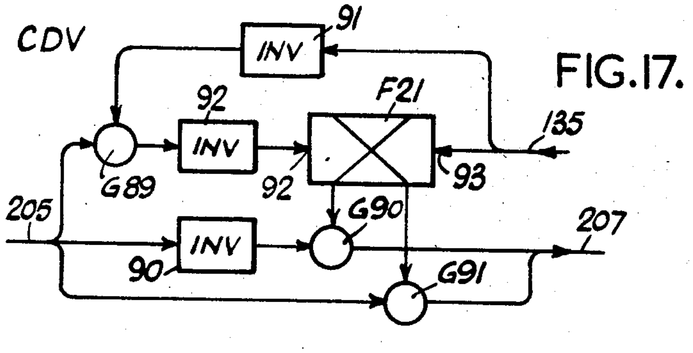

Figure 17 is a more detailed diagram of the arrangements forming the complementer CDV of Fig. 10*b*.

Figure 18:
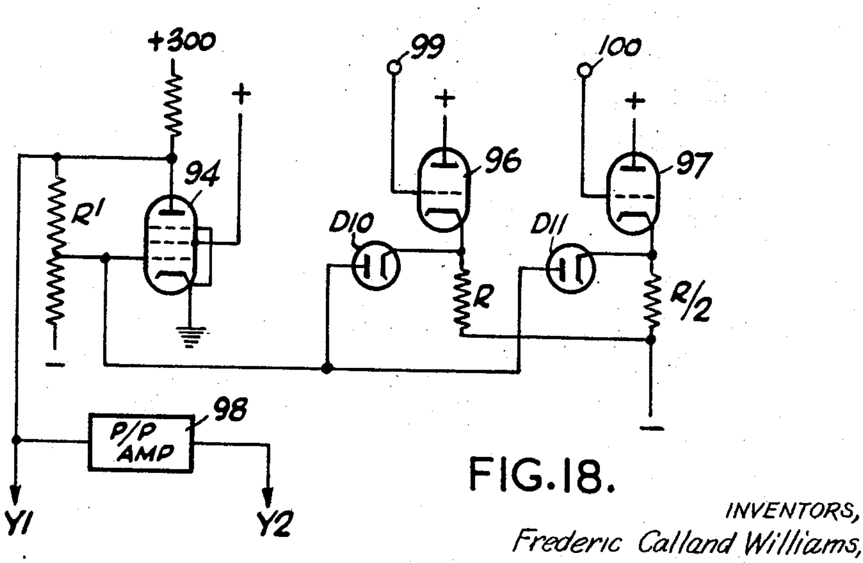

Figure 18 is a circuit diagram illustrating the arrangements for the Y-shift generators MYG and AYG of Figs. 10*a* and 10*c* respectively.

Figure 19:
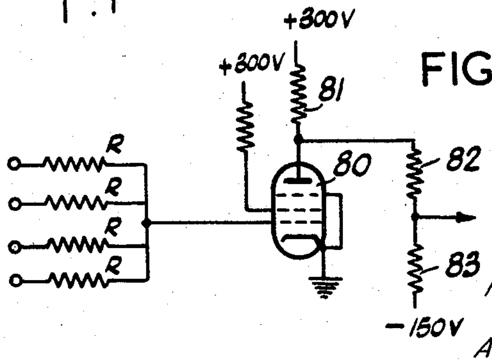

Figure 19 is a circuit diagram showing the arrangements of a so-called "decode" valve for developing a gate or other control potential from a particular combination of function digit values of an instruction signal.

Figure 20:
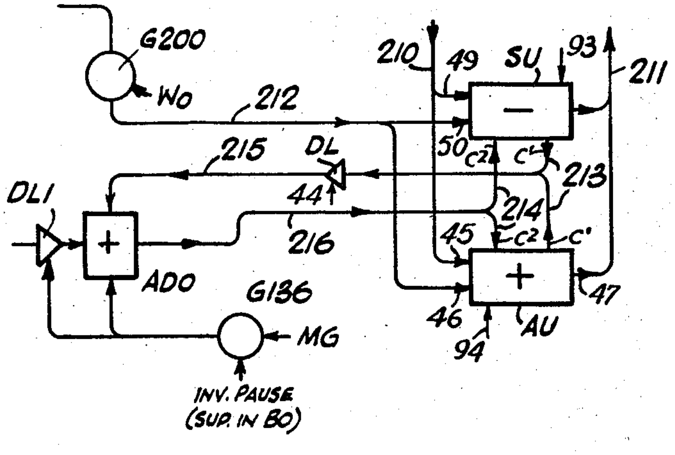

Figure 20 is a diagram showing a modified arrangement of the interconnections between the multiple unit adding device of the multiplier and the accumulator.

The embodiment of the invention to be described forms part of an electronic digital computing machine as described in detail in copending application No. 226,761, filed May 17, 1951, by Frederic C. Williams et al. now Patent No. 2,840,304, and in order that the arrangement and manner of operation of the multiplier according to the present invention may be properly understood the general form and organisation of such computing machine will first be briefly reviewed.

Figure 1:
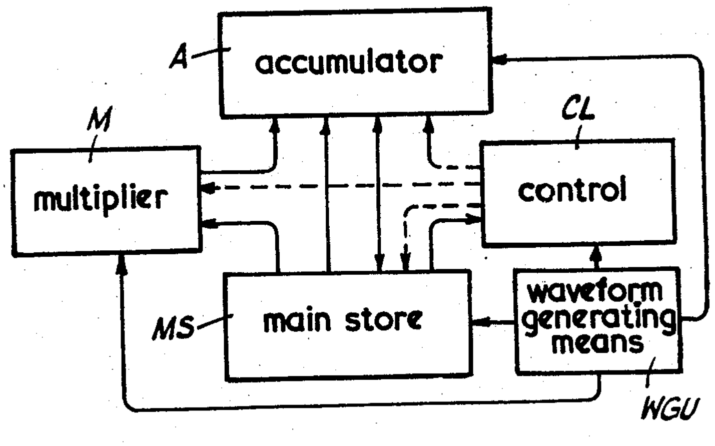
Figure 1 is a block diagram of the principal elements of the computing machine which are concerned with a multiplying operation.

Fig. 1 illustrates, in block schematic form, the principal elements of the machine which are concerned with multiplication. These are the main store MS which serves to record both the number- and instruction-representing electric signals to be used in a multiplying operation; an accumulator A which serves to record any number-representing signal fed thereto and also to effect an arithmetic operation, such as addition or subtraction, with such recorded number signal and a further number signal which may be subsequently applied thereto, the answer-representing signal resulting from such arithmetical operation being then recorded in the accumulator in replacement of the original signal; a control unit CL which governs the cyclic operation of the machine by withdrawing instruction signals from the main store MS as they are required and by sending appropriate signals derived from such instruction to other parts of the machine to cause the operations called for by the instruction to take place; the multiplier M forming the subject of the present invention and which receives factor-representing number signals, i.e. the signals representing the multiplier number D and the multiplicand number R, from the main store MS and after effecting a multiplication operation therewith delivers a product-representing signal to the accumulator A and, finally, waveform generating means shown collectively at WGU and comprising a plurality of interconnected circuit devices which provide a range of electric waveforms which serve to define and control the operating rhythm of the machine.

The machine operates with binary numbers and instructions signalled by electric pulse trains, examples of which are shown respectively in Fig. 11*i* and Fig. 11*j* and in which the presence of a negative-going pulse during a defined interval of time, known as the "digit period," indicates the binary value "1" whereas the absence of such a pulse in any digit period represents the binary value "0." The digit periods *p*0, *p*1 . . . *p*23 are each of 10 microseconds duration and as the machine is fundamentally designed to work with 20-digit binary numbers, a sequence of 20 such digit intervals is required to express any one number. The storage devices used in the machine are of the cathode ray tube type as described by F. C. Williams and T. Kilburn in Proc. I.E.E., part III, March 1949, pages 81–100 (hereinafter called reference A) and as these devices require a further period equal to 4-digit periods between handling any two numbers for effecting the flyback motion of the tube beam, the expression in electric pulse signal train form of any number or instruction occupies in all, 24 digit periods or 240 microseconds. This 240 microsecond time period constitutes the minor cycle or "beat" time of the machine and, as explained in detail by F. C. Williams and others in Proc. I.E.E., part II, February 1951, pages 13–28 (hereinafter called reference B) the machine requires a minimum of 4 of such beat periods to constitute a major cycle or "bar" during which any one computation step is performed. Certain types of computation steps, including those of multiplication, need more than the aforesaid 4 beat periods and in this case the bar or major cycle length is suitably extended by the addition of extra beat periods.

In each beat period of 24 digit periods the first 4-digit periods are those used for the flyback motion of the tube beam while the remaining periods numbered *p*0, *p*1 . . . *p*19 in Fig. 11 are those used for signalling the actual digit values.

In any number-representing signal the binary power value of each digit period is progressively increased the first digit period *p*0 representing binary power $2^0$, the second digit period *p*1 the binary power $2^1$ and so on.

Instruction signals are identical with number signals but their respective digit periods do not have the same binary numerical significance. Instead, certain digit periods, e.g. those of periods *p*0–*p*5 are allocated to the selection of the required one out of 64 available storage lines in one of the cathode ray storage tubes. These digits of an instruction are known as the 1 digits. Further digit periods, e.g. those of *p*6–*p*9 are similarly allocated to the selection of a particular one out of sixteen different cathode ray tubes which are available in the store. These digits are known as the *e* digits. Other digit-periods such as those of *p*13–*p*19, serve to control the function which is to be performed by the machine during any bar period. These are known as the *f* digits. Still other digit-periods of an instruction are used for other purposes as explained in the aforementioned copending application but as these are of no consequence in the present multiplication operation they will not be further referred to.

In order to avoid undue complexity use is made in the drawings of block schematic symbols to represent a wide variety of different pieces of electronic equipment and to facilitate proper understanding of these block diagrams typical examples of practical circuit arrangements for certain of such block symbols will first be given with reference to Figs. 2–9.

The symbol of Fig. 2*a* indicates what is known in the computer art as an "And" or coincidence gate circuit, hereinafter referred to as "a gate," which requires the simultaneous presence of two or more appropriate voltages at its signal input terminals 1, 2, 3 to provide any usable output at its output terminal 4. Fig. 2*b* shows one practical circuit arrangement for such a gate in which input terminals 1, 2, 3 are connected to the respective anodes of diodes D1, D2, D3 whose cathodes are connected in parallel to the input of a cathode follower valve stage 5 and also to one end of a load resistance 6 which is connected at its opposite end to a source of negative potential −150 v. The output from the cathode follower stage 5 supplies the gate output terminal 4. Such an arrangement operates by means of potentials which are negative-going with reference to their normal or resting level and only when all of the separate input terminals 1, 2, 3 are supplied simultaneously with a suitable negative voltage will a corresponding negative-going voltage appear on the output terminal 4. As will be explained later the majority of the controlling waveforms within the machine have a resting level which is about 3 volts positive to earth potential and an active level which is appreciably negative, say 20 volts or more, with respect to earth. A gate of this form may comprise any number of diodes from two upwards and the method of extension in the practical circuit is shown by the addition of further diodes D4, D5 in dotted lines in Fig. 2*b*.

Figures 2A, 2B, 3A, 3B, 4A, 4B, 5A, 5B, 6A, 6B, 7A, 7B, 8A, 8B, 9A, 9B:
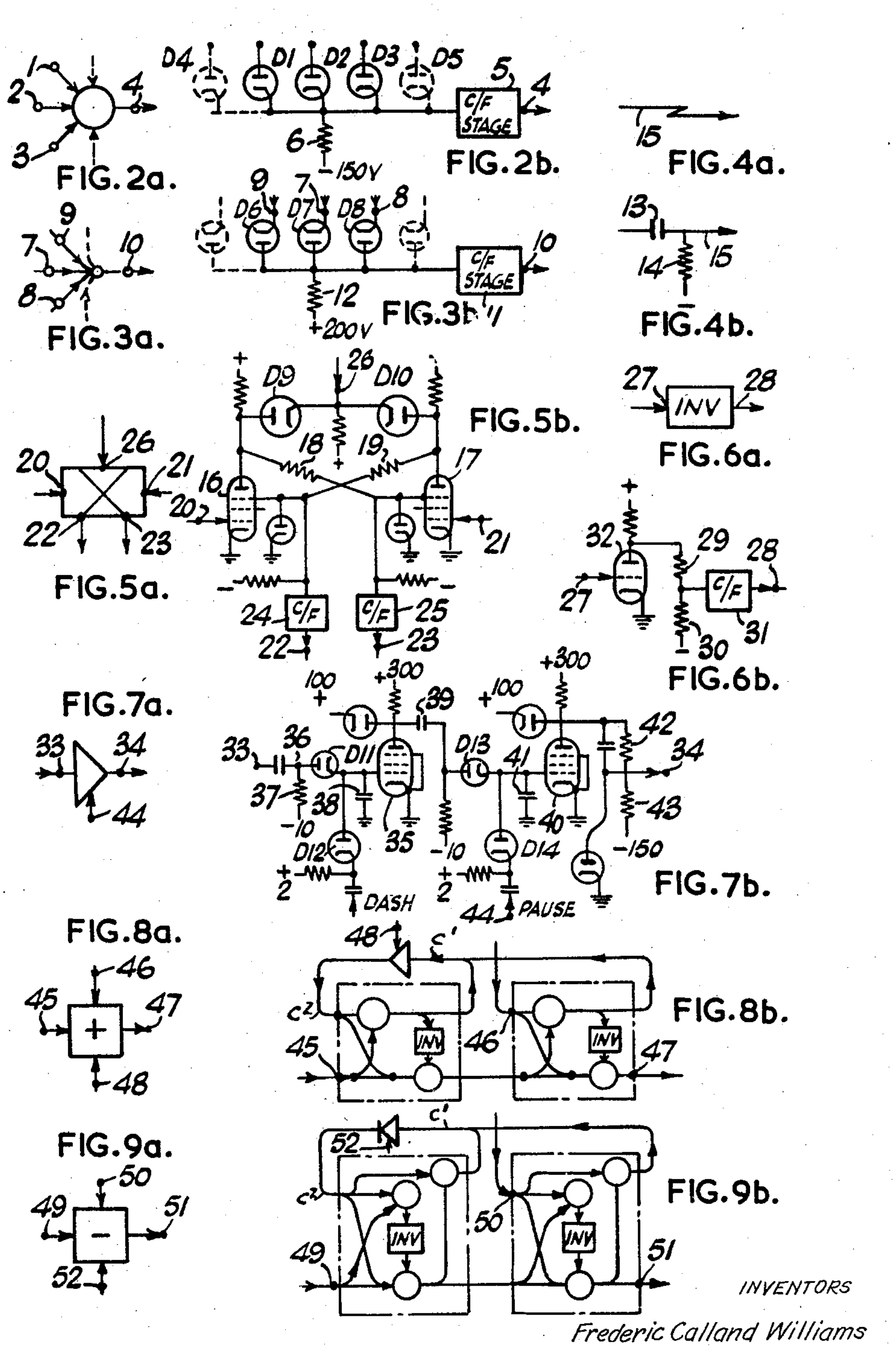
Figures 2–9 illustrate a number of graphical symbols used in the drawings together with a more detailed showing of equivalent circuit arrangements for such symbols.

The symbol of Fig. 3*a* represents what is known in the computer art as "Or" gate or buffer circuit, hereinafter referred to as a "buffer" in which any input occurring at one or more of the input terminals 7, 8, 9 is transmitted to the output terminal 10 regardless of the condition of the other inputs at the same time and without any reaction on such other inputs. A typical circuit example of such a buffer is given in Fig. 3*b* and comprises a plurality of diodes D6, D7, D8 whose cathodes are respectively connected to the input terminals 7, 8, 9 and whose anodes are connected in parallel to the input of a cathode follower stage 11 and also to one end of a load resistance 12, the opposite end of which is connected to a suitable source of positive potential +200 v. The output terminal of the cathode follower stage 11 constitutes the output terminal 10. With this arrangement which operates, as with the devices of Fig. 2, with active voltages which are negative-going with respect to their resting level, the presence of a negative-going voltage at any input terminal causes the transmission of an equivalent voltage to the output terminal 10. The effect at the output terminal 10 is substantially the same whether one or several of the input terminals are energised actively at the same time. As with the device of Fig. 2 the number of separate inputs may be extended as desired.

The symbol of Fig. 4*a* indicates the inclusion in the circuit lead 15 concerned of a differentiating network as indicated, for example, in Fig. 4*b* as comprising a series capacitor 13 and resistance 14 which is normally connected to a source of negative potential. The effect of such a differentiating circuit is well-known and, with the square pulse signals normally used within the present machine, serves to provide a negative-going spike at the leading edge of each square pulse and a positive-going spike on the trailing edge of the same pulse or, in the case of certain inverse or paraphase waveforms which are used and whose pulses are positive-going, a positive-going spike on the leading edge and a negative-going spike on the trailing edge.

The symbol of Fig. 5*a* indicates an electronic trigger circuit having two stable states, e.g. a circuit of the so-called "Eccles Jordan" type as illustrated in Fig. 5*b*. This circuit comprises two thermionic valves 16, 17, usually of the pentode type, cross-connected between opposite anodes and suppressor grids with D.C. paths including resistors 18, 19 to form a conventional trigger circuit in which one valve of the pair is always cut off and the other valve conducting. The state of such a circuit at any time can be altered by applying a negative-going pulse to the valve which is conducting, for example, by means of the triggering input terminal 20 to the control grid of valve 16 or by the resetting input terminal 21 to the control grid of valve 17. Application of a negative pulse to any valve while it is itself cut off has no effect. Thus with the circuit so far described the trigger circuit may be set into one condition, referred to as its "triggered" state, by an input pulse to terminal 20 and may be reset to its opposite or "reset" state by a pulse to terminal 21. According to the state of the circuit i.e. according to which valve is conductive, so the potentials on the suppressor grids of both valves will alter from one level to another and these are made available as output voltages at output terminals 22, 23 through cathode follower stages 24, 25. With the circuit arrangement as shown the application of a negative-triggering pulse to terminal 20 will cause valve 16 to become non-conductive whereby its suppressor grid potential will fall to a negative value and the output at output terminal 22 will likewise be negative whereas the output at the other output terminal 23 will be higher, e.g. a little above earth potential. Alteration of the circuit state by a reset pulse to terminal 21 will cause valve 17 to become non-conductive whereby the suppressor grid of that valve will be driven negatively and the output at terminal 23 will now become negative and the output at terminal 22 will rise to just above earth potential.

Instead of separately changing the circuit into first one and then the other of its alternative states by individual triggering and resetting pulses to the respective input terminals 20, 21 such a circuit may be supplied with a common "reversing" input by which any applied negative pulse causes changeover of the circuit from its original state to its opposite state. Such a reversing input is shown at terminal 26 which is connected by way of diodes D9, D10 to the respective anodes of the two valves 16, 17.

Referring to the equivalent symbol in Fig. 5*a* the position of the respective triggering and resetting terminals 20, 21 with respect to the common reversing input terminal 26 should be noted. A trigger circuit of this kind may comprise either or both of the triggering/resetting and reversing facilities and the presence or absence of the input terminals on the symbol will indicate the type of circuit employed.

The symbol of Fig. 6*a* indicates a phase inverter which provides for the supply at the output terminal 28 of a positive-going pulse waveform having a negative resting level in response to a negative-going pulse waveform which has a resting level of just above earth potential applied to input terminal 27 or vice versa. An example of a practical circuit arrangement is illustrated in Fig. 6*b* as comprising a thermionic amplifier valve 32 whose control grid is connected to the input terminal 27 and whose anode output, drawn from a potential divider network of resistors 29, 30, is applied to the input of a cathode follower stage 31 whose output terminal constitutes the output terminal 28. This symbol is also used to denote the substantially equivalent device known in the computer art as a "negator" or "Not" device by which an output pulse is supplied in any digit interval where no input pulse is applied and by which, conversely, no output pulse is supplied when an input pulse is present.

Fig. 7*a* shows the symbol for a delay device by which any pulse signal occurring at the input terminal 33 in one digit period of a number signal group of digit periods *p*0–*p*19 is delayed and caused to occur at the output terminal 34 in the next subsequent digit period of a number signal group. Thus a pulse in digit period *p*0 will reappear in period *p*1 whereas a pulse in digit period *p*19 will reappear in period *p*0 of the next subsequent group. The related circuit arrangement is shown in Fig. 7*b* and comprises a first thermionic valve 35 whose control grid is supplied from the input terminal 33 by way of a differentiating network of capacitor 36 and resistor 37 and diode D11, the said control grid being also connected to the earthed cathode by way of a capacitor 38 and also by way of diode D12 to a source of negative (Dash) pulses (Fig. 11*a*) occurring in each digit period. The anode of valve 35 is coupled by way of capacitor 39 and diode D13 to the control grid of a second valve 40 which is similarly arranged with a capacitor 41 between its control grid and cathode and supplied at its control grid by way of diode D14 and reset terminal 44 to a source of positive (Pause) pulses (Fig. 11*b*) which occur in each digit period except those of *p*20–*p*23. The anode output of valve 40 is made available at output terminal 34 by way of a potentiometer network of resistors 42, 43.

In the operation of such a device valve 35 is rendered conductive by the positive spike at the trailing edge of an applied input signal pulse and remains in this condition, due to charging of capacitor 38, until the negative-going leading edge of the Dash pulse of the next digit period through diode D12 cuts the valve off again. The positive rise which occurs at the anode of valve 35 at this instant is applied through diode D13 to render valve 40 conductive and this condition persists, due to charging of capacitor 41 until the trailing edge of the Pause pulse of the same digit period, supplied through diode D14, cuts the valve 40 off again.

Fig. 8*a* is the symbol for an adding device as used in Fig. 10*b* while 8*b* shows schematically one suitable apparatus arrangement. Such devices are well-known and will not be described in detail as the form of the circuit can readily be appreciated from the previous description given of the symbols shown therein. This adding device has first and second input terminals 45 and 46 and an output terminal 47 together with a reset terminal 48 for supplying the requisite Pause waveform pulse for the delay which forms part of the device. By the incorporation of such a pulse controlled delay device the adding circuit is made capable of carrying over the intervening digit periods *p*20–*p*23 between two adjacent groups of number digit periods.

Fig. 9*a* illustrates the closely equivalent symbol for a subtracting circuit having two input terminals 49 and 50, an output terminal 51 and a reset terminal 52. One form of equivalent apparatus arrangement for such a logical subtracting device is shown in Fig. 9*b*.

Fig. 13 shows, schematically, the waveform generator unit WGU of Fig. 1. The basic 10 microseconds digit period time is determined by a 100 kc./s. clock oscillator CO whose output is applied to an assymetrical pulse squaring circuit DWG which provides the Dash waveform of Fig. 11*a* comprising a negative-going pulse from resting level of just above earth potential for the first 6 microseconds in each digit period. An inverse version of this waveform known as the Pause waveform and shown in Fig. 11*b* which has a negative resting level and which rises to above earth potential for the first 6 microseconds in every digit period is also made available through an inverter stage 53. The Pause pulses are suppressed during digit periods *p*20–*p*23 by passing the inverter output through gate G20 which is controlled by the INV BO waveform described later.

The output from circuit DWG is applied to a square pulse generating circuit DTG of the monostable or flip-flop type which serves to generate the Dot waveform referred to in the aforesaid references. The same output from circuit DWG is also applied to a further square pulse generating circuit SPG which provides the Strobe waveform also referred to in the aforesaid references.

The output from circuit DWG is further applied as a triggering medium to a pulse divider PDV which serves to count the applied input pulses and deliver and output pulse coincident with every 24th input pulse. This circuit may be of any suitable type e.g. it may comprise two serially arranged divider circuits of the Phantastron type. The output from divider circuit PDV is applied as an initial trigger pulse to a pulse selecting circuit PPG which comprises a series of 24 combined trigger-gate circuits P0–P23, the first circuit of the chain being P20 and the last being P19 as shown. These trigger-gate circuits effectively comprise a gate which is normally closed but which is held open for a limited time following the application to the trigger circuit of a priming pulse which precedes in time that of a pulse which is passed through the gate, the trigger circuit being reset immediately after the pulse has passed through the gate. One such device is described in copending application No. 132,580 (now U.S.A. Patent No. 2,683,802), filed December 12, 1949, by Frederic C. Williams et al. Each trigger circuit except P19 is connected with the next following trigger circuit to supply a priming pulse thereto and while each trigger circuit including P20 is also connected to the immediately preceding circuit to supply a resetting pulse thereto. The respective gates are all also supplied with the Dash waveform (Fig. 11*a*) from circuit DWG whereby the first Dash pulse following the arrival of a priming pulse from the pulse divider PDV is allowed to pass through circuit P20 which then primes circuit P21 and is thereafter reset so that circuit P21 passes the next Dash pulse to its own output lead and so on whereby each of the individual output leads from the circuits P0–P20 carry one only of the Dash pulses coincident in timing always with the same digit period. The first pulse *p*0 shown in Fig. 11*d* being coincident with the *p*0 digit period, the second *p*1 shown in Fig. 11*e* with the second digit period *p*1 and so on. The last pulse waveform of the series, *p*19, is shown in Fig. 11*f*.

The pulse outputs from circuits P20 and P0 of the pulse selecting circuit PPG are used as triggering and resetting pulses respectively for a trigger circuit BOWG which generates the Blackout or BO waveform of Fig. 11*c* which comprises a negative-going pulse during digit periods *p*20–*p*23. An inverted version of this BO waveform controls the gate G2 of the INV pause waveform previously mentioned. This BO waveform thus effectively marks out each beat period of the machine rhythm and is accordingly used for a variety of further timing control functions.

The commencement of each operative major cycle or bar is marked by the release of a Prepulse signal, Fig. 12*a*, which is generated either manually by means of key KMP where only a single cycle of operation is required or automatically so as to follow immediately upon the immediately preceding bar whatever the beat length of the latter. The Prepulse generating arrangements comprise a gate G40 supplied with the BO waveform and controlled by a trigger circuit F1 so as to be opened when such trigger circuit is in its triggered condition and by a further 7S waveform which is normally at its negative, active, level. The differentiated negative-going edge of the BO waveform at each *p*20 period is thus available to form a Prepulse signal. The trigger circuit F1 is continually reset at the beginning of each beat period by the application of the *p*0-pulse thereto but it can be placed into its triggered condition by a *p*1-pulse supplied through gate G41 and gate G42 in series. Gate G41 is controlled by the INV S1, the INV A1 and INV S2 waveforms of Figs. 12*c*, 12*e* and 12*g* respectively whose generation will be described later and also by the combination of the INV A2 waveform, Fig. 12*i*, and a 5/7B or code signal waveform derived from the machine control instruction indicating a requirement for an extended beat length. Gate G41 is thus, in normal 4-beat operation, open only during beat A2 of the bar. Gate G42 is normally held continuously open by the potential delivered through switch S1 from trigger circuit F2 when the latter is in its reset state. The trigger circuit F2 is one which is concerned with the automatic stopping of the machine in the event of a fault and is normally held in its reset state by resetting pulses applied over lead 195 but which can be set to its opposite or "on" state by a signal fed over lead 196 due to the occurrence of a detected fault. As such fault control means forms no part of the invention it will not be further described, but details thereof may be obtained from the aforesaid copending application No. 226,671, filed May 17, 1951, now Patent No. 2,840,304. Alternatively, the gate G42 can be opened by a potential available when key KMP is closed. A *p*1 pulse therefore normally passes gates G41 and G42 to trigger circuit F1 during the last beat A2 of a bar and this allows the next BO pulse to generate a Prepulse and initiate a new operative bar.

The previously described beats composing each bar are defined separately by waveforms known as the S1, A1, S2, A2 waveforms for a 4-beat bar and the further waveforms A3, S3 and B4 for extended 5 or 7 beat bars. These waveforms together with their inverse counterparts are shown in Figs. 12*b*–12*o*.

These beat defining waveforms are generated as follows. Each Prepulse signal is applied to trigger circuit F3 to set it into its triggered state at the beginning of a selected beat and remains so until reset by the differentiated BO waveform at the end of that beat. This is the first beat and the trigger circuit outputs provide the S1 and and INV S1 waveforms. The negative-going trailing edge of the INV S1 waveform is used, after differentiation, to trigger a second trigger circuit F4 which is likewise reset by the BO waveform at the end of the second beat following a Prepulse. This trigger circuit provides the A1 and INV A1 waveforms. Similarly the trigger circuit F5 is triggered from the INV A1 waveform and reset by the BO waveform at the end of the third beat after a Prepulse to provide the S2 and INV S2 waveforms and the fourth trigger circuit S6 is triggered by the INV S2 waveform and reset by the BO waveform at the end of the fourth beat after a Prepulse to provide the A2 and INV A2 waveforms. These four trigger circuits are the only ones normally operative for 4-beat operation but if extended beat length is required this is called for by the particular composition of the instruction signal. This, inturn, provides the 5/7B code signal waveform and opens gate G50 by which the INV A2 waveform is used to operate trigger circuit F7 to its triggered condition. This circuit is reset by the next following BO waveform at the end of the fifth beat after a Prepulse to generate the A3 and INV A3 waveforms. In a manner similar to the earlier circuits the INV A3 waveform whenever it is present, triggers the circuit F8 which is reset by the BO waveform, at the end of the sixth beat after a Prepulse to provide the S3 and INV S3 waveforms and the latter is then used to trigger circuit F9 which is reset by the next BO waveform pulse at the end of the seventh beat following a Prepulse signal to generate the B4 and INV B4 waveforms. This 5/7B code signal available at this time causes the closing of gate G41 whereby trigger circuit F1 is not supplied with the *p*1 pulse in beat A2 but remains reset. The generation of a further Prepulse signal is thus inhibited until the fifth beat A3 has been completed when the removal of the instruction signal from a staticisor element in the control system and which provides the controlling 5/7B signal, allows the gate G41 to open again and thus to pass the next available *p*1 pulse to the trigger circuit F1. As will be clear later the beat periods S3 and B4 of one bar can overlap with the periods S1 and A1 of the next following bar so that the next Prepulse need not be held up until the end of beat B4.

A number of controlling waveforms additional to those so far described are employed specifically during multiplication. These will be described later.

The main store MS employs a total of 16 cathode ray tube storage devices constructed and arranged in the manner described in the aforesaid reference A while the general organisation and manner of operation of the complete store is as described in the aforesaid reference B with selection of the required tube by means of the *e* digits (*p*6–*p*9) of the instruction signal and selection of the required storage line in the tube by means of the *l* digits (*p*0–*p*5) of such instruction signal. In view of such available description the main store will not be further described apart from indicating that its read terminal is connected by lead 200, Fig. 10*a*, to the multiplying arrangements of the invention and also by way of lead 199 to other elements of the machine such as subsidiary data storage means and output mechanism, both of which have no bearing upon the present invention and are accordingly not shown. The write input terminal of the main store MS is similarly supplied by way of lead 198 from such other elements of the machine. As the supply of data to the main store forms no part of the present invention no further description thereof will be given.

The control unit CL is shown schematically in Fig. 15 and closely resembles in both form and operation that described in reference B. It essentially comprises a cathode ray tube store device arranged for scanning on two separate 20-digit storage lines known respectively as the CI and PI lines under the control of a Y-deflection potential provided by the waveform generator 69 which in turn is controlled by various waveforms including the S2 and A1 waveforms as shown. For the purpose of this invention the generator 69 can be regarded as causing scanning of the CI line except when it is supplied with a negative control voltage when it causes scanning of the PI line. The PI line is therefore scanned during beats A1 and S2 and the CI line during any other beats of a bar. The XTB waveform is supplied in the usual way to the X-deflection plates to produce linear scanning motion of the beam for any selected line in synchronism of the beat period of the machine rhythm, the beam flyback taking place during the period of the BO pulse.

The device has the usual signal pick-up plate 61 feeding its output to an amplifier 62 which in turn supplies signals to a read unit 63 of conventional form as described in the aforesaid references A and B. The output from the read unit 63 supplies one input terminal 66 of an adding circuit 64 the other input terminal 67 of which is supplied by way of gate G21 and lead 70 from the main store MS and with the *p*0 pulse through gate G22. Gate G21 is controlled by the A1 waveform to be open in the A1 beat and gate G22 is similarly opened in beat S1 by the S1 waveform. The output terminal 68 of the adding circuit 64 is connected to the input terminal of the write unit 65 of the storage device and also to lead 72 which is connected to the main staticisor MSTR, Fig. 14. Means which include the A1 waveform are also provided for supplying a negative erase voltage to the read unit 63 during each A1 beat so as to clear the PI line of its previous signal content.

The arrangements of the main staticisor MSTR are shown in Fig. 14 and comprise a total of twenty 2-stable-state trigger circuits F40–F59.

The trigger circuits F40–F45, concerned with staticising the first six or *l*-digits of an instruction signal, are supplied by way of lead 72 and gate G30 with signals from control CL, each triggering input to such trigger circuits being through one of the relate gates G60–G65 which are controlled respectively by the *p*-pulses *p*0–*p*5 whereby any "1" pulse signal in the related digit periods in an instruction signal alters the trigger circuit concerned to its triggered condition during either the S1 or the S2 beats of any bar when the gate G30 is opened by its controlling S1 and S2 waveforms. When triggered any trigger circuit provides on its left hand output terminal a negative voltage which is used for controlling of the Y-shift generator forming part of the address selection means of the main store MS in the manner described in detail in reference A. These six trigger circuits have their right hand or "0" output connected by way of a differentiating circuit to the reversing input terminal of the next trigger circuit whereby they constitute a binary counter chain. The reversing input terminal of the first circuit F40 is supplied with the A3 waveform. Whenever there is an A3 beat the counter chain setting set up just previously is automatically increased by one. Each of these trigger circuits F40–F45 is reset by the S1 or the S2 waveforms combined in buffer B75. Resetting thus occurs just before the circuits are again set-up by an instruction signal.

The trigger circuits F46–F49 are also supplied with the same signals arriving through gate G30 and by way of individual gates G66–G69 controlled respectively by the p6–p9 *p*-pulse and operate in similar manner in response to the pulse content of the digit positions p6–p9 of an instruction signal to set up a combination of output potentials which, by acting on the blackout valve associated with each of the different storage tubes in the main store MS in the manner described in reference B serve to blackout every tube but one, i.e. the selected one, so that this tube alone is operative during the following action beat. These trigger circuits are not connected as a counter chain but are reset by the S1 and S2 waveforms.

Trigger circuits F50–F52 operate in generally similar manner but as these are not concerned with any operation connected with the present invention they are not shown and will not be described.

The remaining trigger circuits F53–F59 serve to staticise the *f*-digits of the P.I. instruction signal which is available in the S2 beat and are accordingly each supplied with such signal from lead 72 through gate G31 and individual gate G73–G79 controlled respectively by the p13–p19 *p*-pulse waveforms. The gate G31 is controlled by the S2 waveform alone to be open only during the S2 beat of any bar. Each of the trigger circuits is reset by the negative edge of the INV A1 waveform which always occurs just before the circuits are about to be set-up.

The various trigger circuits are preferably constructed in the maner described in detail in connection with Fig. 15 of reference B and provide at least two alternative output potentials one of which (known as the "1" output) is negative-going when the related circuit is in the triggered state and earth potential when the circuit is in its reset state and the other of which (known as the "0" output) is negative-going while the circuit is in its reset state and earth potential while the circuit is in its triggered state. Appropriate selection of such trigger circuit outputs are used to operate gates and other circuits directly or alternatively to influence a decoding valve as shown in Fig. 19.

Although the total number of different instruction signal combinations of the *f* digits, p13–p19 is considerable, consideration will only be given here to the six instructions directly concerned with multiplication and which, for the purposce of convenient illustration, will be assumed to utilise the digits p13, p14, p15 and p16 of the instruction signal. The six instructions are as follows:

The so-called D instruction of which there are two variants—

*s.D*—(1.0.0.0) which indicates that the multiplier number D is to be transferred from the main store MS to the multiplier and that such number is of unsigned form and $s^1$.*D*—(1010) which also indicates transfer of the D number but that it is of signed form The so-called R instruction of which there are four forms—

*s.R*—(0100) which causes the transfer of the multiplicand number R from the main store MS to the multiplier and then continues with the multiplication with addition of the resultant product into the accumulator A and indicates that the R number is of unsigned form.

$s^1$.*R*—(0110) which is similar to *s*.R except that the R number is of signed form.

**—*s.R*—(0101) which is similar to *s.R* except that the** product is to be subtracted from the existing content of the accumulator A and —$s^1$.*R*—(0111) which is similar to $s^1$.R except that subtraction is to be made in the accumulator A instead of addition.

Referring now to Figures 10*a*, 10*b* and 10*c*, the arrangements according to the invention comprise a separate multiplier storage tube MT arranged with its read unit MRU and write unit MWU in the usual regenerative loop between the signal pick-up plate 81 and the beam modulating electrode 82. The read unit MRU is arranged to be capable of being inhibited by appropriate erase voltages supplied to the input gate valve of such unit, such erase voltages comprising either a potential KMC derived from a manually operable key used for clearing the machine as a whole and which need not be further described or by the output from a gate G114 which is supplied with the A2 and A3 waveforms through buffer B1 as one controlling input and with a control signal from the staticisor MSTR which is active during and only during any code signal comprising those *f* digits of an instruction word which indicates a multiplying operation and which in the example given, is conveniently derived by combining the (1) output potentials from the trigger circuits F53 and F54 in a suitable buffer gate whereby when either trigger circuit is triggered the requisite code signal will be supplied to the gate G114. Thus an erase potential will always be given to the tube during beats A2 and A3 of any operative bar of a multiplication. The tube MT is arranged to store on any one of four separate and parallel 20-digit lines, the particular active line during any beat period being determined by the Y-shift waveform supplied to the Y deflection plates of the tube from the MY-shift generator MYG, which is described in detail with reference to Figure 18, and which is controlled by the setting of the two trigger circuits F31 and F32 referred to later. As will be made clear later the multiplier tube is arranged to scan the four lines *d*0, *d*1, *r*0 and *r*1 in varying order as set out on the timing chart of Figure 12 during the various successive beats of the bars involved in carrying out either the D instruction or the R instruction of a multiplication operation.

The input to the multiplier store MT is on lead 206 and is derived always from the read output terminal of the main store MS over lead 200 and the gate G113 which has two controlling inputs. One of these comprises the A2 and A3 waveforms combined in buffer B2 and the other is a code signal, similar to that used for gate G114 and active during the presence of any instruction calling for a multiplier operation. This code signal may be derived from the same source as that supplied to gate G114.

Two outputs are available from the multiplier storage tube MT. The first of these is by way of lead 201 through gate G115 which has a single controlling input consisting of the S2 and S5 waveforms combined in buffer B3. The signal on this lead 201 is fed to each of 20 similar gates G0–G19 (Fig. 10*c*) which have a single controlling input supplied respectively with the p0–p19 *p*-pulse waveforms so as to be opened successively one during each digit period of a beat. The output from the first gate G0 is supplied as a triggering input signal to the first of 20 similar two-stable state trigger circuits W0–W19, the triggering input of the remaining trigger circuits being similarly supplied respectively with the outputs from the associated gates G1–G19. These trigger circuits thus constitute a second staticisor which converts the dynamic pulse signal train supplied on lead 201 into a series of static potentials indicative of the pulse content of each of the digit periods in that pulse train. This multiplier staticisor MTR may, in practice, also form a staticisor for other purposes in the machine, for instance, that used in connection with magnetic instruction words involved in transfers between the main storage device MS and a subsidiary magnetic drum store as described in the aforementioned copending application 226,761 filed May 17, 1951, now Patent No. 2,840,304. Each of the trigger circuits W0–W19 is reset by the output from gate G117 which has two controlling inputs one being the *p*20 *p*-pulse waveform and the other being the output from buffer B4 which is supplied with the S2 waveform on one input and on the other input with the output from an inverter device INV 2 or the output from gate G129 combined in buffer B5. The inverter INV 2 is supplied with the INV S5 waveform and also, through buffer B6, with the output from an inverter circuit INV 3 which itself is supplied with a code signal which is active during any of the four R instructions and which may accordingly consist of the (1) output potential from the trigger circuit F54 of the main staticisor MSTR. The output from this inverter circuit INV 3 also forms the controlling input of gate G129 which is supplied with the A2 waveform.

The second output from the multiplier storage tube MT is on lead 203 (Fig. 10*a*) to gate G137 which has a single controlling input derived from an inverter circuit INV 1 whose input is supplied from a buffer B8 having two inputs, one comprising the INV MG waveform and the other the MC*d* waveform referred to later. The output of gate G137 is supplied to the signal input terminal of a complement converter CCV whose form is described in detail later with reference to Fig. 16. The operation of this complement converter is controlled by the output from gate G127 which has three controlling inputs, one comprising the potential derived from the (1) output terminal of trigger circuit F55 (Fig. 14) of the main staticisor MSTR which deals with the *f*15 digit, another comprising the MG waveform (Fig. 12*g*) and the third comprising the MC*m* and MC*d* waveforms (Figs. 12*r* and 12*s*) combined in buffer B9. In practice the complement converter is normally inoperative and serves to pass the signals applied to its input terminal directly to its output terminal in unaltered form. When rendered active by the control potential made available from gate G127, it operates to extend the applied input number signal from 40 digit length to 80 digit length by examining the last or most significant digit of the input signal supplied thereto and then providing 40 repetitions of that examined digit ("1" or "0" as the case may be) in all remaining digit periods of the number.

The output from complement converter CCV on lead 205 is fed to each of twenty similar gates G200–G219 (Fig. 10*b*) which each have a single controlling input supplied respectively with the (1) output potentials of the trigger circuits W0–W19 (Fig. 10*c*) of the second staticisor MTR. The output from each of the gates G200–G218 is applied as one input respectively to each of a plurality of adding devices AD0–AD18 while the output from the gate G219 is applied instead to the input terminal of a complementer device CDV which is described in greater detail with reference to Fig. 17.

The output from the complementer device CDV is applied to a delay device DL19 of the so-called shuffle type as described with reference to Fig. 7*b*. The output from this delay device DL19 is applied as the second input to the adding device AD18. The output from the adding circuit AD18 is fed to a second delay device DL18 and the output from the latter is applied as the second input of adding device AD17 and so on, the output from the first adding device AD0 constituting the sum-representing signal output terminal to lead 202. The reset signals necessary for the operation of the various delay devices and the various adding devices is constituted by the INV Pause waveform (see Fig. 11*b*) applied through gate G80 which is controlled by the MG waveform.

The complementer CDV is normally inoperative, that is to say it passes the input signals thereto to its output terminal in unaltered form, but when rendered active by energisation of its control lead 135 with a suitable positive potential it serves to convert the applied number-representing pulse signal trains into complement-representing signal trains. The controlling potential on lead 135 is made available from a variety of sources which includes the INV MG waveform and the "0" output potential from a trigger circuit F34 i.e. when the later is in its reset state. Trigger circuit F34 is arranged to be triggered by the output from the gate G130 and to be reset by the output from the gate G131. Each of these gate circuits is supplied with the A2 waveform as one controlling input, the second input of the gate G130 being a code signal consequent upon the setting-up of the main store staticisor MSTR with the *s'.D* function signal and the gate circuit G131 being controlled by the setting-up of the staticisor with the *s.D* function signal. A further source of control signals for the complementer CDV is made available from an inverter circuit INV4 which is supplied by way of a further inverter INV 5 with the code signal consequent upon the setting up of any of the four R codes in the staticisor MSTR. Another alternative source of control potential is by way of buffer B10 with the output of gate G202 which has five controlling inputs constituted respectively by the INV A2, INV A3, INV S3, INV S4 and the INV S5 waveforms.

The controls for the MY-shift generator MYG (Fig. 10*a*) of the multiplier tube MT are derived from the two trigger circuits F31 and F32 which generate the MC*l* and MC*m* (Fig. 12*s*) and the MC*d* (Fig. 12*r*) and MC*r* waveforms respectively. Trigger circuit F31 is supplied continuously with a reversing signal input constituted by the BO waveform whereby it is always reversed at the end of each beat. It is additionally supplied with a triggering input which may comprise the S2 waveform, the output from gate G121 or the output from gate G118. Gate G121 is supplied with the A2 waveform and is controlled by the staticisor MSTR to be active, i.e. open, under the condition of any *s*.R code signal in an instruction. Gate G118 is also supplied with the A2 waveform and is controlled by the staticisor MSTR to be active during either of the D instructions.

The second trigger circuit F32 is supplied with a continuous reversing input constituted by the differentiated MC*l* output waveform from trigger circuit F31 while as a triggering medium it is supplied with either the S2 waveform, the output from gate G118 or the S5 waveform derived from trigger circuit F35. The same S5 waveform is applied as a resetting input to trigger circuit F31 while the output from gate G121 is supplied as a similar resetting input to trigger circuit F32.

The trigger circuit F35 generates the S5 waveform (Fig. 12*p*) and is supplied as a triggering medium with the output from gate G200 which is supplied with the INV B4 waveform and has a single controlling input derived from the staticisor MSTR and active whenever any R code signal is contained in an instruction. This trigger circuit is reset by the differentiated BO waveform. A further trigger circuit F33 provides the MG and INV MG waveforms. This trigger circuit has its triggering input supplied either by a differentiated version of the INV S5 waveform or by the output from gate G201 which is supplied with the A2 waveform and which has a controlling input active during any *s*.R code in an instruction in the staticisor MSTR. This trigger circuit is reset by the AYC*m* waveform.

The accumulator A comprises a cathode ray storage tube AT having the usual read unit ARU and write unit AWU connected between the signal pick-up plate 91 and the beam modulating electrode 92 of the tube. These read and write units form part of the usual regenerative loop which may be completed either by way of gate G106 which provides a direct interconnection or by way of an adding unit AU or by way of a subtracting unit SU. The arrangements of these subtracting and adding units conform substantially to those shown in Figs. 9*b* and 8*b* respectively and for purposes of ready identification, the various input and output leads have been given corresponding references to those used in the said Figs. 9*b* and 8*b*. The particular one of these three elements which is used to complete the regenerative loop is controlled from the staticisor MSTR in accordance with the particular function digit combination of the instruction word which is set up on such staticisor. The controlling potentials for elements SU, AU and G106 are supplied by way of leads 93, 94 and 95 respectively. One input terminal of both the adding unit AU and the subtracting unit SU is connected to lead 202 from the adder ADO while the usual read output lead 96 and write input lead 97 are also provided in the accumulator store for interconnection with other parts of the machine not shown or described.

The accumulator tube is supplied with the usual X-time base waveform XTB for line scanning movement of the beam and is arranged to have four storage lines *a*0, *a*1, *a*2 and *a*3 for receiving respectively the lowest, next highest, next to highest and highest 20-digit sections of an 80-digit number.

Deflection of the tube beam to scan a particular one of these lines is effected by a Y-deflection potential delivered to the Y-plates of the tube from the A–Y shift generator AYG which resembles that indicated in detail in Fig. 18 and which is controlled by the output potentials delivered from two trigger circuits AYC0 and AYC1.

The trigger circuit AYC0 is supplied with the BO waveform to its reversing input terminal and is also supplied with the differentiated A2 waveform at its resetting terminal, its two outputs providing the AYC0 and INV AYC0 waveforms respectively. The trigger circuit AYC1 is supplied at its reversing input terminal with the differentiated INV AYC0 waveform and at its resetting terminal with the differentiated A2 waveform. This trigger circuit provides the AYC1 and INV AYC1 waveforms at its respective output terminals.

The manner of operation of the arrangements described is as follows. The multiplying operation utilises two separate instructions, first, the D instruction, by which the 40-digit multiplier number D is read out from the main store MS and is fed to its allotted storage location in lines *d*0 and *d*1 of the multiplier store MT and second, the R instruction, in which the 40-digit multiplicand number R is similarly read out from the main store MS and is fed to its allotted storage location in lines *r*.0 and *r*.1 of the multiplier store MT and is used to carry out the multiplication operation. Fig. 12 illustrates in tabular form the various steps of each operation. Although shown as the R instruction following sequentially after the D instruction, this is not essential and other operations may be performed by the machine in between these two instructions.

The D instruction is selected by the control unit CL in the normal operating routine of the machine as described previously and in the aforesaid copending applications and in reference publication B, the first beat, S1, of an operation bar involving the D instruction causing the customary alteration of the CI or Control Instruction number signal stored on the CI line of the storage tube in the control unit CL to the new number CI+1 and the application of such new number signal to the sections F40–F45 and F46–F49 of the main staticisor MSTR (see Fig. 14) to set up the latter in readiness to take over control of the Y-shift generator which controls the address selecting mechanism of the main store MS in the next following beat A1 and thus to select the particular storage location in such main store which contains the D instruction. During the following beat, A1, this instruction is read out from the main store MS over lead 70 (Fig. 15) and through gate G21 onto the PI line of the control unit store from which it is transferred during the third, S2, beat over lead 72 to the main staticisor MSTR to reset the main store address selecting sections thereof to select the storage location of the first half of the D number itself; at the same time, this D instruction sets the remaining *f* or function control sections F53–F59 of the main staticisor MSTR in accordance with the particular D operation required.

During the fourth, A2, beat of the bar the aforesaid D number is read out from the main store MS through gate G113 (Fig. 10*a*) which is now opened by the presence of an M code signal and the simultaneous application of the A2 waveform, and from thence to the write unit MWU of the multiplier store MT to cause writing into the latter of the 20-digits thus made available. This 20-digit first portion of the D number is written onto the *d*0 line of the four storage lines available on the storage tube MT by reason of the stimulation of the MY-shift generator MYG by the $MC_1$ and $MC_d$ output waveforms from the two controlling trigger circuits F31 and F32 which, to cause this particular line *d*0 to be scanned, are each set into their triggered state by the application of the A2 waveform through gate G118 which is opened by the presence of either of the *s*.D or *s'*.D instructions.

The operative bar involving this D instruction is automatically extended to include a fifth beat, A3, by reason of the existence of a 5/7 beat code which opens gate G50 (Fig. 13) and allows operation of the trigger circuit F7 to generate the A3 waveform. During this fifth beat the setting of those sections (F40–F45) of the main staticisor MSTR which control the main store address selecting mechanism is automatically increased by one due to the application of the A3 waveform to the reversing input of the first trigger circuit F40, thereby selecting the address location of the 20-digit second portion of the required D number. Such second 20-digit portion of the D number is now read out on lead 200 through gate G113 (which is still held open, this time by the A3 waveform) and fed to the write unit MWU of the multiplier storage tube MT. Simultaneously the BO pulse occurring at the beginning of the A3 beat has triggered the first trigger circuit F31 into its reset condition whereby the influence of this circuit and the second trigger circuit F32 on the MY-shift generator MYG now causes the second line *d*1 of the multiplier store MT to be scanned so that such second half of the D number is stored on this line *d*1.

To ensure erasure of any previously existing content of either of the *d*0 or *d*1 lines of the multiplier store MT, the A2 and A3 waveforms are simultaneously applied through gate G114 which is opened in the presence of all multiplier codes.

Simultaneously, during the A2 beat of this D operation, the trigger circuit F34 (Fig. 10*c*) is set into one or the other of its two alternative states in accordance with the character of the operative D instruction. This is for the purpose of remembering for subsequent use during the associated R operation, whether or not the D number is of signed or unsigned form. This is effected by the application of the A2 waveform either through gate G130 which is opened only in the presence of an *s'*.D instruction (indicating signed convention) to cause triggering of the trigger circuit F34 into its triggered condition or by the application of the same A2 waveform through gate G131 which is opened only on the presence of an *s*.D instruction (indicating unsigned convention) to cause the trigger circuit F34 to be in its reset condition. This trigger circuit F34 provides one of several controlling potentials for the complementer device CDV in a manner described later.

During the subsequent R instruction (which need not follow immediately on the D instruction) the operative bar is of extended length and comprises a total of eleven consecutive beats as shown in Fig. 12. The last two beats of this bar may, if necessary, overlap with the first two beats of the next following operative bar.

During the first beat, S1, of the operative bar concerned with the R instruction the control unit CL has its CI number changed automatically in the usual way to CI+1 and this number is fed to the main staticisor MSTR to set the main store address selecting sections (F40–F49, Fig. 14) thereof to select the storage location of the next (PI) instruction which is the required R instruction. This R instruction is read out from the main store MS onto the PI line of the control unit store during the next beat, A1, and during the next following beat, S2, this instruction is fed to the main staticisor MSTR to set the main store address selecting sections in accordance with the address of the required R number in the main store MS and also to control the various function staticisor sections in accordance with one or the other of four alternative R code signals.

At the end of beat S2 the main staticisor MSTR is, therefore, set up to select the required R number from the main store MS and to provide the required one of the four R code signals which serve, in the usual manner, to control the various gates and like devices. During the same third beat, S2, the gate G115 (Fig. 10*a*) is opened by the presence of the S2 waveform while the application of the same S2 waveform to each of the trigger circuits F31 and F32 constrains the latter each to their set condition which is that which stimulates the generator MYG to cause scanning of line *d*0 in the multiplier store MT holding the first half of the previous D number so that during this beat S2 the first 20-digit portion of such D number is read out from the multiplier store MT over lead 201 to each of the twenty separate sections of the further staticisor MTR (Fig. 10*c*).

The trigger circuits W0, W1 . . . W19 control the related series of gate circuits G200–G219 (Fig. 10*b*) so as to open such gate circuits if the associated trigger circuit has been triggered by an applied "1" digit signal and to close such gate circuits if the trigger circuit has been left untriggered due to the presence of a "0" digit signal. To ensure clearing of the various sections of the staticisor MTR from any previous setting condition they may be holding they are each supplied in parallel through gate G117 with a number of resetting media which will be described later. One of these, however, is the S2 waveform which is allowed to pass the gate G117 during the *p*20-Pulse interval which occurs during the Blackout period at the very beginning of the S2 beat and immediately prior to the application of the first portion of the D number as described above.

During the next following beat, A2, the first 20-digit portion of the R number is fed out from the main store MS over lead 200 and through gate G113, which is again opened by the presence of an M code signal and the simultaneous application of the A2 waveform, and is thence applied to the write unit MWU of the multiplier store MT and simultaneously to gate G137.

Considering first the operation of the multiplier store MT. The trigger circuit F31 is triggered into its set condition and the trigger circuit F32 is triggered into its reset condition by the application of the A2 waveform through gate G121 which is opened in the presence of any one of the four R code signals. As a consequence of this particular setting of the two trigger circuits, the third, *r*0, line of the multiplier store MT, is scanned during beat A2 and in consequence the applied first 20-digit portion of the R number is written into that line of the store. As in the previous D operation, the A2 waveform is applied through gate G114 (Fig. 10*a*), which is opened by the existence of an M code signal, to act as an erasure control inhibiting the operation of the read unit MRU and thus removing any previous stored number existing on this line *r*0 of the store MT.

The gate G137 is controlled through the inverter INV.1 by the INV.MG and the MC*d* waveforms combined in buffer B8 and as both of these waveforms are, at this time, at their raised level, the output from the inverter INV.1 is negative-going and serves to open the gate G137 whereby such first 20-digit portion of the R number, in addition to being written into the multiplier store MT, is also fed through the complement converter CCV to the input terminals of each of the gates G200–G219 (Fig. 10*b*).

According to whether these latter gates are in opened or closed condition as previously described in dependence upon the first portion of the D number so that the whole of the first-20-digit portion of the R number signal will be applied to or withheld from one input of each of related adding circuits AD0, AD1 . . . AD18 and the complementer CDV. In the manner described more fully in the aforesaid copending application No. 132,579, filed December 12, 1949, now Pat. No. 2,685,407, this assemblage of gate circuits controlled by the digit values of the multiplier number, associated adding circuits and interconnecting unit delay devices operates to provide on lead 202 a serial pulse train signal representing the product of the applied R and D first number portions.

At the end of beat A2, the first 20-digit portion of the R number will have been applied to each of the adding circuits and the first 20-digits of the partial product will have emerged from the adding circuit AD0 on lead 202 but a further 20 digit-intervals will be required to take care of the extended length of such partial product number since the last digit of the first portion of the R number applied through gate G219 has only just started to traverse the chain and will require the time of such further 20 digit intervals to reach the lead 202. At the end of this beat, A2, the address selecting mechanism of the main store MS is altered automatically as with the preceding D opertion, to select the address of the second 20-digit portion of the R number which is then read out as a continuation of the first portion from the main store MS through gate G113 which is still open to the multiplier store MT and to the gate G137. The multiplier store MT is arranged now to scan the fourth line *r*1 by reason of the stepping on of the first trigger circuit F31 by the BO pulse occurring at the beginning of beat A3 so that such second 20-digit portion of the R number is stored on this fourth line *r*1. At the same time this second 20-digit portion passes, like the first 20 digit portion, through gate G137 which is still open and thence through the complement converter CCV to each of the gate circuits G200 . . . G219 which still remain set according to the first 20 digits of the D number since the trigger circuits W0 . . . W19 have not been altered. These further 20 digits form a continuation of the first 20 digits of the R number to continue the operation of the multiplying circuit of gates G200–G219, adding circuits AD0–AD18 and delay units DL0–DL19 so that the resultant serial pulse train emerging on lead 202 is representative of the partial product of the whole of the 40 digits of the R number with the first 20 digits of the D number.

The resultant 60-digit pulse train representing the first 60 of the total 80 digits of the final product number (produced by multiplication of two 40-digit numbers) is fed over lead 202 to the subtracting unit SU and the adding unit AU of the accumulator A. Only one of these units is operative depending upon the type of R instruction in use and for the moment it will be assumed that the adding unit AU is in use.

Assuming also that the accumulator store has no existing number content the 60-digits emerging from the adding unit AU will be the same as those of the input train on lead 202 and will arrive at the write unit AWU so that the first or least significant 20-digits occur in beat A2, the next 20-digits in beat A3 and the final 20-digits in the next following beat S3. These three 20-digit groups are caused to be written into lines *a*0, *a*1 and *a*2 of the storage tube AT in the following manner.

Each trigger circuit AYC0 and AYC1 is put into its reset condition at the beginning of the A2 beat by the application of the differentiated front edge of the A2 waveform and when in such reset condition causes storage line *a*0 to be scanned. At the end of beat A2 after the first 20 digits of the partial product have been written on line *a*0, the first trigger circuit AYC0 is reversed by the *p*21 *p*-Pulse so that during the following beat, A3, the trigger circuit AYC0 is set into its triggered condition while the trigger circuit AYC1, which has its common triggering input supplied from the trigger circuit AYC0, remains unaltered since it derives a trigger pulse from AYC0 only when the latter returns from its triggered to its reset state. In consequence the Y-shift generator AYG causes scanning of the second line *a*1 to the accumulator store AT during beat A3 to receive thereon the second 20 digits of the partial product while in the next following beat, S3, the trigger circuit AYC0 is again reversed by the next *p*21-Pulse to its reset condition and this time causes reversal of the second trigger circuit AYC1 also whereby the latter is put into its triggered condition. This state of affairs conditions the generator AYG to produce scanning of the third line *a*2 of the store AT during the beat so as to receive the third 20-digit group of the partial product. In the next following beat, B4, further reversal of the first trigger circuit AYC0 by the next *p*21-Pulse takes place with no change in the second trigger circuit AYC1. This causes stimulation of the generator AYG to produce scanning of the fourth line *a*3 in the store AT to allow the recording of a possible carry-over digit arising from the addition of the product of a 40-digit number with a 20 digit number to a number already in the accumulator and also to accommodate any necessary extension digits in the case of signed numbers. The end of the seventh beat B4 will mark the end of the first stage involving the formation of the first partial product of the whole of the R number multiplied by the least significant portion of the factor D. A further four extra beats, S5, S6, S7 and B8 then follow to perform a similar operation with the whole of the R number and the most significant portion of the factor D. This extension beyond the maximum of seven beats in the normal rhythm of the machine previously described, is caused by the inhibition of the generation of the Prepulse, which initiates the commencement of the next operative bar, until the end of beat S6 by means of the 7S waveform which is generated in its INV form in gate G202 and is applied to gate G41, Fig. 13 to close the latter. This gate, G202, in addition to control by the INV versions of the A2, A3, S3 and B4 waveforms, is also influenced by the INV version of the S5 waveform shown in Fig. 12(*p*). This latter waveform is generated by trigger circuit F35 which normally rests in its reset condition by the continuous application of BO pulses to its resetting input. At the end of beat B4, however, the differentiated negative-going trailing edge of the INV.B4 waveform, which is supplied through gate G200 during any R operation, applies a trigger pulse which serves to put this trigger circuit F35 into its triggered condition until the arrival of the next BO pulse at the end of the eighth beat, thereby providing a negative pulse embracing this eighth or S5 beat period. As the Prepulse signal is generated at the end of a beat the next available Prepulse is that which occurs at the end of the beat following the S5 beat, namely the S6 beat.

During the S5 beat, the trigger circuit F31 will be put into its reset condition and the trigger circuit F32 will be put into its set condition by the front edge of the S5 waveform so that the storage line *d*1 in storage tube MT will again be scanned and, in consequence, the second 20-digit portion of the D number which was previously stored on that line will be made available at the read output from the store MT and will be applied through gate G115 which is now opened again by the S5 waveform and then over lead 201 to the various sections W0 . . . W19 of the multiplier staticisor MTR. These staticisor sections will have been reset at the beginning of the S5 beat by the application of the INV.S5 waveform through the inverter INV.2 to the gate G117 which, upon being opened during the *p*20-Pulse interval, will cause resetting of each trigger circuit immediately before the arrival of the second 20-digit portion of the D number on lead 201. As with the previous 20-digit portion the various trigger circuits W0 . . . W19 will be set up during beat S5 according to the configuration of the related digits of the second group of 20-digits of the D number and these trigger circuits in turn will control the gates G200 . . . G219 in accordance with the configuration of the second portion of the D number. During the beat S5, the gate G137 is held closed since the INV.MG and the $MC_d$ waveforms will be negative and will provide an input inhibiting any output from the inverter INV.1.

In the next following beat, S6, the trigger circuits F31, F32 will be advanced one step by the intervening BO pulse and the operative scanning line of the multiplier store MT will now be that of *r*0 which is holding the first 20-digits of the stored R number and this 20-digit portion will be made available at the read output of the store. This first 20-digit portion of the R number will then be fed through gate G137, which is opened again due to reversal of the INV.MG and the $MC_d$ waveforms, to the complement converter CCV and thence to each of the gates G20 . . . G219 of the multiplier arrangement which, as before, commences the production of a second partial product resulting from the multiplication of the R number by the second or more significant half of the D number. In a manner similar to that of the first multiplying operation, during the next following beat, S7, the trigger circuit F31 and F32 will again be advanced one step to change the scanning line in the storage tube MT to that of the *r*1 line and thus to supply during such beat, S7, the second 20-digit portion of the R number which was previously stored on line *r*1 to the still-open gate G137 and thence through complement converter CCV to the gates G200 . . . G219 so that during beats S6, S7 and a final beat, B8, a 60-digit serial pulse train representing the multiplication of the 40 digits of the R number by the second and most significant 20 digits of the D number will issue on lead 202 for application to the accumulator A.

As this second 60-digit partial product is, in effect, of a significance 20 digits greater than that of the first 60-digit partial product arising from the first multiplication step it is necessary to adjust its application to the partial product already held in the accumulator store AT by an appropriate amount so that the digit positions 0–59 of such second partial product number coincide with the digit positions 20–79 of that already in accumulator store. This is effected by constraining the accumulator storage tube AT to scan line *a*1 during beat S6, line *a*2 during tbeat S7 and line *a*3 during beat B8. This required scanning sequence follows automatically by the stepping-on of the two serially-connected trigger circuits AYC0 and AYCL by each BO pulse since line *a*3 was scanned during beat B4 and the intervening beat, S5, during which line *a*0 will automatically be scanned is not required for the reception of any input to the accumulator so that the beat S6 following beat S5 will find the accumulator tube AT scanning line *a*1 in correct order for receiving the first 20 digits of the second partial product issuing on lead 202. The combination in the adding unit AU of the first partial product circulating around the regenerative loop of the store AT with the applied second partial product results in a final product number being stored in the four lines *a*0 . . . *a*3 of the accumulator A by the end of beat B8 which marks the end of the multiplication.

The operation so far described has taken no account of any attention to the signed or unsigned character of the D or R numbers involved. As already explained, however, the trigger circuit F34 (Fig. 10*b*) is conditioned according to the type of D instruction so as to be triggered only if the D number is signed. At all other times it provides a negative potential on lead 135 which prevents any complementing operation by the complementer CDV which therefore passes any applied R number direct to the delay DL19 without any modification. If the trigger circuit F34 is set to indicate a signed D number then the above described inhibiting potential will be removed from the complementer CDV.

Although thus released by the trigger circuit F34, the complementer CDV must still be held inoperative until beats S6, S7 and B8 of the R instruction. This is effected by supplying also to the complementer as control potentials, the INV.MG waveform, which is negative except during beats A2, A3, S3, B4, S6, S7 and B8 of an R instruction, and the 7S waveform which is derived from the INV 7S waveform previously described through inverter INV.4 from the output of the multiple "and" gate G202. As this 7S waveform is negative-going during the beats A2, A3, S3 and B4 when operation would be permitted by the above noted INV.MG waveform, the complementer CDV can only operate during beats S6, S7 and B8 of an R instruction and then only if the preceding D instruction indicated the use of a signed D number.

When thus released, the complementer CDV operates to put into complement form the R number (with any extension thereof) which may be passing through gate G219 during the second (most significant) transfer operation and which must, as shown in the numerical example previously given, be subtracted from instead of added to the other partial products.

When the R instruction has indicated the use of signed convention for the R number then it is necessary (as in the simple numerical example already given) to examine the most significant digit of the R number and in accordance with whether this is a "0" or a "1" to extend such number from 40 to 80 digits length by 40 successive repetitions of the last digit. The existence of signed convention is indicated by the presence of a "1" digit at the *f*15 digit location of the P.I. or instruction word which, when applied to the main staticisor MSTR in beat S2 causes appropriate stimulation of one of the output leads of such staticisor section. This available output voltage is applied to the gate G127 which is controlled also by the MG waveform of Fig. 12(*q*) and by the outputs MC*d* or MC*m* of the trigger circuits F31 and F32 as shown in Fig. 12(*r*) and 12(*s*) after combination in an "Or" type gate. The resultant control waveform for the complement converter CCV is shown in Fig. 12(*t*) from which it will be seen that the circuit CCV is operative only during the beats A3, S3 and B4 and beats S7 and B8 and then only in the presence of an instruction signal indicating signed convention. In the known manner of such complement converter circuits a continued succession of "1" digit signals are emitted during ensuing beats S3 and B4 or B8 if such 40th digit was a "1" or, alternatively, no signals are emitted, thereby indicating digit value "0," if the examined 40th digit was a "0." The resultant R signal thus applied to each of the gate circuits G200 . . . G219 is accordingly an extended one indicative of the sign of the R number.

As the R instruction may not follow the D instruction immediately and as the fact that any fresh instruction being set up upon the main staticisor MSTR is to be an R instruction is not made evident until the end of beat S2, it is necessary to arrange for the first-portion of the previously provided D number to be transferred to the second staticisor MTR during beat S2 of every bar following the D transfer in order that such staticisor shall be set up in readiness for use in beats A2 and A3 should the instruction prove to be for an R operation. At the same time, if the instruction concerned proves not to be an R instruction the same staticisor may be required for other purposes and arrangements are accordingly provided in the form of inverter INV.3 and gate G129 for resetting each staticisor section W0 . . . W19 at the beginning of beat A2 unless the instruction is for an R operation.

One form of the complement converter CCV of Fig. 10*a* is shown schematically in Fig. 16 and comprises a trigger circuit F20 whose triggering input terminal 82 is supplied with the signals on input lead 203 by way of gate G82 and phase inverter 87. The gate G82 is controlled by the potential available on lead 86 from gate G127 (Fig. 10*a*) and by the *p*19 *p*-pulse waveform. The (1) and (0) outputs from the trigger circuit F20 control respectively gates G83 and G84. Gate G84 is in a direct interconnection path between input and output leads 203, 205 whereas gate G83 is in a path between the same input and output leads which includes an inverter or Not device 84 which serves to supply an output pulse in the absence of an input pulse and vice-versa. The central input on lead 86 is also applied by way of phase inverter 85 to the resetting input terminal 83 of the trigger circuit F20.

In operation, the trigger circuit is normally held in its reset state so that its (0) output terminal is negative, by the negative voltage delivered from the phase inverter 85 when the control potential on lead 86 is in its raised or zero value. In consequence gate G83 is closed and gate G84 is open and the input signals pass unaltered from input lead 203 to output lead 205.

The control potential on lead 86 is one which is negative-going during the A3, S3 and B4 beats and also during the S7 and B8 beats of any bar involving an instruction signalling the use of a signed R number. During the *p*19 digit period of each of these beats gate G82 is opened and allows any pulse content of the signal on lead 203 of such digit period to pass to the inverter 87. Only beats A3 and S7 are effective however as the gate G137 is closed during beats S3, B4 and B8. When such a "1" pulse is present it is phase inverted in the inverter 87 and its negative-going trailing edge triggers the trigger circuit F20 to its triggered condition. This causes closure of gate G84 and opening of gate G85 whereby the signal on lead 203, which is necessarily a succession of "0" signals (due to closure of gate G137) appears on lead 205 as a succession of "1" signals thereby extending the form of the last digit (*p*19) "1" of the original signal. If, on the other hand, the aforesaid *p*19 digit period contained no pulse indicating "0" no input is available for the trigger circuit F20 and the state of the latter is unaltered whereby gate G84 remains open and there is no generation of any "1" pulses for the next following 40 digit periods, the signal being merely extended by the equivalent of 40 "0" signals.

Upon the reversion of the control potential on lead 86 to its normal raised level, the phase inverter 85 provides a negative voltage which resets the trigger circuit F20 if it has been triggered.

One form of the complementer CDV of Fig. 10*b* is shown schematically in Fig. 17 and comprises a trigger circuit F21 whose triggering input terminal 92 is supplied with the input signals on lead 205 by way of gate G89 and phase inverter 98 and whose resetting terminal 93 is supplied with the control potential on lead 135. Gate G89 is controlled by the inverse form of the control potential on lead 135 supplied through phase inverter 91. The (1) output terminal of the trigger circuit controls a gate G90 while the (0) output of the trigger circuit controls a second gate G91. The gate G91 is in a direct interconnection path between the input lead 205 and the output lead 207 which supplies the delay device DL19 (Fig. 10*b*). The gate G90 is in an alternative path between these two leads which also includes an inverter or Not device 90.

The operation of this device is in many respects similar to that of the complement converter CCV. When the controlling potential on lead 135 is in its normal i.e. negative state the complementer is inoperative as the trigger circuit is set into its reset condition and the gate G89 is closed due to the action of the phase inverter 91. In this condition the gate G91 is open and gate G90 is closed thereby allowing direct transmission of signals between input lead 205 and output lead 207 in unaltered form. Whenever the control potential on lead 135 is altered to its raised level to bring the complementer into action then gate G89 is opened due to the action of the inverter 91 but the trigger circuit remains in its previous condition to keep gate G91 open and gate G90 closed until the arrival of the first signal pulse on the input lead 205. This pulse passes to the output lead through gate G91 and also passes the gate G89 and the phase inverter 98 so that the negative-going trailing edge of such pulse triggers the trigger circuit F21 into its triggered condition immediately after the signal pulse has passed through gate G91 to the output lead 207. The reversal of trigger circuit F21 closes gate G91 and opens gate G90 whereby, for the remainder of the signal transmission period the alternative path through Not device 90 and gate G90 is operative instead of the direct path through gate G90. This causes all signals after the first 1 digit to be reversed i.e. all "1" signals to be converted into "0" signals and vice-versa. Upon lowering of the control potential on lead 135 the trigger circuit is reset to close gate G90 and reopen gate G91.

The circuit arrangement for either of the Y-shift generator devices MYG and AYG of Figs. 10*a* and 10*c* is shown in simplified form in Fig. 18.

The device shown comprises a valve 94 whose purpose and manner of operation is precisely the same as that of the Y-shift valve of Figs. 23 and 35 of the aforesaid reference A in that it controls the flow of current through a resistor $R^1$ in proportion to the amount of input current applied to its control grid on lead 95. Lead 95 is connected to the anodes of two diodes D10, D11 whose cathodes are joined respectively to the cathodes of valves 96, 97 which are arranged, cathode follower style, with cathode lead resistors R and R/2 connected to a source of negative potential. The control grid of valve 96 is connected to a controlling input terminal 99 which is that supplied with the MC1 (or the INV AC0) waveform while the control grid of the other valve 97 is connected to a second controlling input terminal 100 which is that supplied with the MC*d* (or the INV AYC1) waveform.

The manner of operation of this circuit is exactly analogous to that described in reference A, the two valves 96, 97 controlling the supply of either one or two units of current respectively to the valve 94 whereby the potential at the anode of the latter can be varied to any one of four different values corresponding respectively with zero input current, one unit of input current, two units of input and three units of input current. The result of changes on anode potential of valve 94 are applied to one Y plate of the associated cathode ray tube and by way of a paraphase amplifier 98 to the opposite Y plate of the same tube.

The connection of the output adding circuit AD0 in tandem with the further adding circuit AU or subtracting circuit SU of the accumulator A may introduce difficulty in obtaining proper operation of the accumulator writing unit due to the extra delay which can occur. As is already known in cathode ray tube stores, the "1" digit pulses have their leading edges a little late, relative to the true instant of commencement of the related digit-interval of the machine operating rhythm in view of the need to effect testing of the output pulse from the tube signal plate by the slightly delayed Strobe pulse waveform. The signal arriving through gate G200 has come from such a store and has, moveover, also passed through gate G137 and the complement converter CCV en route with some additionally incurred delay. The added further delay in the adding circuit AD0 (which cannot be compensated as in the other adding circuits by corresponding shortening of the delay times of the following delay circuits) may result in the input to the adding or subtracting unit of the accumulator A being so out of synchronism with the machine rhythm, which must be followed by the accumulator write unit AWU, as to give false operation. Such difficulty can be reduced be rearrangement of the elements as shown in the modification of Fig. 20 in which the output from the gate G200 is supplied directly over lead 212 to one input of the adding and subtracting units AU, SU of the accumulator A while the read output from the accumulator store is fed, as before, over lead 210 to the other input of such units AU, SU. The second input to the adding device AD0 of the multiplier chain is provided over lead 215 by the "carry" output on leads 213 from either of the units AU or SU (whichever is in use) by way of delay DL while the output from such adding device AD0 is fed over lead 216 to the "delayed-carry" input leads 214 of the units AU, SU. The output from the latter units is applied over lead 211 to the accumulator write unit in the usual way. By this means the delays occurring in the device AD0 can now be compensated by adjustment of the delay DL.

We claim:

1. For an electronic binary digital computing machine operating in the serial mode with a rhythm consisting of a major cycle or bar composed of a plurality of sequential equi-length minor cycles or beats in each of which a word of $x$ digits length is signalled by a series of sequential electric pulse signals in a single signal transmission channel, a multiplying arrangement which operates with multiplicand and multiplier numbers each of $nx$ digits length (where $n$ is a positive integer) and which comprises a cathode ray tube storage device having write input means and read output means and signal controlled address selecting means by which any desired one of $2n$ separate storage lines each having a capacity for storing $x$ digit signals may be rendered available for reading or writing purposes in any required beat period, a signal input terminal connected to said write input means, first and second control gates each having an input terminal connected to said signal input terminal and said read ouput means and an output terminal and a control terminal, a staticisor device having $x$ separate sections and a common input terminal connected to the output terminal of said first control gate, said staticisor device providing $x$ separate output control potentials determined respectively by the $x$ different digits of an input pulse train supplied to said common input terminal, a group of $x$ gate circuits each having an input terminal connected to said output terminal of said second control gate and an output terminal and a control terminal, circuit means connecting the control outputs from each of said staticisor sections to the control terminals of different ones of said $x$ gate circuits, a group of $x-1$ adding circuits each having first and second input terminals and an output terminal, circuit means connecting the first input terminal of each of said adding devices to the output terminal of a different one of said $x$ gate circuits except that gate circuit which is controlled by the section of said staticisor responsive to the most significant digit of the input pulse train to such staticisor, a group of $x-1$ delay devices each imposing a delay time equal to one digit interval of a number-representing pulse train and each having an output terminal connected to the second input terminal of a different one of said adding devices and an input terminal, circuit means connecting the input terminal of each of said delay devices except one to the output terminal of a different one of each of said adding devices except that adding device whose first input terminal is connected to the gate circuit which is controlled by the staticisor section responsive to the least significant digit of the input pulse train to such staticisor, so as to form a serial chain of alternate delay devices and adding devices, circuit means connecting the input of the remaining delay device to the output of the remaining one of said $x$ gate circuits, control means for providing control potentials to said first and second control gate circuits and said address selecting means to cause application of input signals representing respectively the multiplier and multiplicand numbers through said input terminal to said write input means to record each of said numbers in sections of $x$ digits length in said separate storage lines of said storage tube, to effect reading out of a first $x$ digit section of said stored multiplier number through said first control gate to said staticisor to provide control potentials to said $x$ gate circuits in accordance with the digit configuration of said $x$ digit section of said multiplier number, then applying a signal train representing each of the $x$ digit sections of said multiplicand number in turn through said second control gate to each of said $x$ gate circuits to produce a partial product-representing pulse train at the output terminal of the final adding circuit, then effecting reading out a second $x$-digit section of said storage multiplier number through said first control gate circuit to said staticisor to provide control potentials to reset said $x$ gate circuits in accordance with the digit configuration of said second $x$-digit section of said multiplier number and thereafter reading out each of said $n$ sections of said stored multiplicand number signal in turn through said second control gate to said $x$ gate circuits to provide a second partial product-representing signal train at the output terminal of said final adding circuit and accumulator means for combining said first and second partial product-representing signal trains to form a final product-representing signal.

2. A multiplying arrangement for an electronic binary digital computing machine operating in the serial mode with a rhythm consisting of a major cycle or bar composed of a plurality of sequential equi-length minor cycles or beats in each of which a word of $x$ digits length is signalled by a series of sequential electric pulse signals in a single signal transmission channel which comprises a multiplication circuit input terminal for receiving multiplicand and multiplier number-representing pulse train signals, a number-signal storage device connected to said input terminal for recording said multiplicand and multiplier number-representing signals each in separate storage locations, said storage device including read-out means and signal controlled address-selecting means by which at least said multiplier number signal can be read out in a plurality of separate sections each of $x$ digits length, a multiplier circuit having a multiplicand number-signal input terminal and multiplier number-signal input means, said multiplier number-signal input means means being limited in capacity to a signal representing $x$ multiplier digits, first circuit means including first gate circuit means connecting said read-out means to said multiplicand signal input terminal, second circuit means including second gate circuit means connecting said read-out means to said multplier signal input means and cyclically operating control means controlling said address-selecting means, said read-out means and said first and second gate circuit means to effect application of a first $x$ digit section of said multiplier number signal to said multiplier signal input means followed by application of said multiplicand number signal to said multiplicand signal input terminal to produce a first partial product representing signal and then the application of a second $x$ digit section of said multiplier number signal to said multiplier signal input means followed by a second application of said multiplicand number signal to said multiplicand signal input terminal to produce a second partial product representing signal.

3. In an electronic binary digital computing machine operating in the serial mode with a rhythm consisting of a major cycle or bar composed of a plurality of sequential equi-length minor cycles or beats in each of which a word of $x$ digits length is signalled by a series of sequential electric pulse signals in a single signal transmission channel, said machine having a data signal storage system, an accumulator and a control system operated by instruction signals for controlling the operation of the machine as a series of discrete computation steps each under the control of a separate instruction signal, the provision of a multiplying system comprising an input terminal, a multiplier circuit having multiplicand signal input means, multiplier signal input means and product-representing output means, said multiplier signal input means of said multiplier circuit being limited in capacity to $x$ digits where $x$ is an integral fraction of the maximum number of digits in said multiplier signal, number-signal storage means separate from said data storage system for recording at least said multiplier-representing signal, said storage means including signal controlled read-out means reproducing said multiplier-representing signal in separate sections each of $x$ digits length, first circuit means including first signal-controlled switch means connecting said read-out means to said multiplier signal input means, second circuit means including second signal-controlled switch means connecting said read input terminal to said multiplicand signal input means, third circuit means connecting said product representing output means to said accumulator and cyclic control means connected to and operated by said control system in response to a single instruction signal for supplying control signals to said read out means and said first and second switch means to effect reading out of a first $x$ digit section of said multiplier signal from said storage means to said multiplier input means followed by application of said complete multiplicand signal to said multiplicand input means to produce a first partial product signal at said output means for transmission through said third circuit means to said accumulator and then reading out of a second $x$ digit section of said multiplier signal from said storage means to said multiplier input means followed by a further application of said complete multiplicand signal to said multiplicand input means to produce a second partial product signal at said output means for transmission through said third circuit means to said accumulator.

4. In an electronic binary digital computing machine operating in the serial mode with a rhythm consisting of a major cycle or bar composed of a plurality of sequential equi-length minor cycles or beats in each of which a word of $x$ digits length is signalled by a series of sequential electric pulse signals in a single signal transmission channel and having a data signal storage system, an accumulator and a control system operated by instruction signals for controlling the operation of the machine as a series of discrete computation steps each under the control of a separate instruction signal, the provision of a multiplying system comprising an input terminal for receiving both multiplicand and multiplier number-representing signal trains, a multiplier circuit having multiplicand signal input means, multiplier signal input means and product-representing output means, said multiplier signal input means being limited in capacity to $x$ digits where $x$ is an integral fraction of the maximum number of digits in said multiplier signal, number-signal storage means separate from said data storage system for recording said multiplicand-representing signal and said multiplier-representing signal, said storage means including signal controlled read-out means for reproducing at least said multiplier-representing signal in separate sections each of $x$ digits length, first circuit means including first signal-controlled switch means connecting said read-out means to said multiplier signal input means, second circuit means including second signal-controlled switch means connecting said input terminal and said read out means to said multiplicand signal input means, third circuit means connecting said product representing output means to said accumulator and cyclic control means connected to and operated by said control system in response to a single instruction signal for supplying control signals to said read out means and said first and second switch means to effect reading out of a first $x$ digit section of said multiplier signal from said storage means to said multiplier input means followed by application of said complete multiplicand signal to said multiplicand input means and to said storage means to produce a first partial product signal at said output means for transmission through said third circuit means to said accumulator and to effect storage of said multiplicand signal in said storage means and then reading out of a second $x$ digit section of said multiplier signal from said storage means to said multiplier input means followed by reading out of said complete multiplicand signal to said multiplicand input means to produce a second partial product signal at said output means for transmission through said third circuit means to said accumulator.

5. In an electronic binary digital computing machine operating in the serial mode with a rhythm consisting of a major cycle or bar composed of a plurality of sequential equi-length minor cycles or beats in each of which a word of $x$ digits length is signalled by a series of sequential electric pulse signals in a single signal transmission channel, said machine having a data signal storage system and a control system operated by instruction signals for controlling the operation of the machine as a series of discrete computation steps each under the control of a separate instruction signal, the provision of a multiplying system comprising input means for receiving signals representing the multiplicand and multiplier numbers, a multiplier circuit having multiplicand signal input means, multiplier signal input means and product-representing output means, said multiplier signal input means being limited in capacity to $x$ digits where $x$ is an integral fraction of the maximum number of digits in said multiplier signal, number-signal storage means separate from said data storage system connected to said input means for recording at least said multiplier signal, said storage means including signal controlled read-out means for reproducing at least said multiplier-representing signal in separate sections each of $x$ digits length, first circuit means including first signal-controlled switch means connecting said read-out means to said multiplier signal input means, second circuit means including second signal-controlled switch means connecting said input means to said multiplicand signal input means, accumulator means, third circuit means connecting said product representing output means to said accumulator means and cyclic control means connected to and operated by said control system in response to a single instruction signal for supplying control signals to said read out means and said first and second switch means to effect treading out of a first $x$ digit section of said multiplier signal from said storage means to said multiplier input means followed by application of said complete multiplicand signal to said multiplicand input means to produce a first partial product signal at said output means for transmission through said third circuit means to said accumulator means and then reading out of a second $x$ digit section of said multiplier signal from said storage means to said multiplier input means followed by application of said complete multiplicand signal to said multiplicand input means to produce a second partial product signal at said output means for transmission through said third circuit means to said accumulator means.

6. A multiplying arrangement as claimed in claim 5 in which the first $x$ digit section of said multiplier signal applied to said multiplier input means consists of those of lower denominational order in said multiplier number and the subsequent second $x$ digit section of said multiplier signal consists of those of higher denominational order.

7. A multiplying arrangement according to claim 6 wherein said number storage means comprises a plurality of separate storage locations each capable of holding one group of $x$ digit signals which includes signal controlled address selecting means operated by said cyclic control means whereby any chosen one of said storage locations can be read out from said storage means.

8. A multiplying arrangement according to claim 7 in which said separate number storage means is arranged to record the hole of each of said multiplicand and multiplier number signals.

9. A multiplying arrangement according to claim 8 in which said number storage means comprises a cathode ray tube type of device having a plurality of separate storage lines one for each of said groups of $x$ digit signals.

10. In an electronic digital computing machine having a data signal storage system and a control system operated by instruction signals for controlling the operation of the machine as a series of discrete computation steps each under the control of a separate instruction signal, the provision of a multiplying system comprising input means for receiving signals representing the multiplicand and multiplier numbers, a multiplier circuit having multiplicand signal input means, multiplier signal input means and product-representing output means, said multiplier signal input means being limited in capacity to $x$ digits where $x$ is an integral fraction of the maximum number of digits in said multiplier signal, number-signal storage means separate from said data storage system connected to said input means for recording at least said multiplier signal, said storage means including signal controlled read-out means for reproducing at least said multiplier-representing signal in separate sections each of $x$ digits length, first circuit means including first signal-controlled switch means connecting said read-out means to said multiplier signal input means, second circuit means including second signal-controlled switch means connecting said input means to said multiplicand signal input means, accumulator means, third circuit means connecting said product-representing output means to said accumulator means and cyclic control means connected to and operated by said control system in response to a single instruction signal for supplying control signals to said read-out means and said first and second switch means to effect reading out of a first $x$ digit section of said multiplier signal from said storage means to said multiplier input means followed by application of said complete multiplicand signal to said multiplicand input means to produce a first partial product signal at said output means for transmission through said third circuit means to said accumulator means and then reading out of a second $x$ digit section of said multiplier signal from said storage means to said multiplier input means followed by application of said complete multiplicand signal to said multiplicand input means to produce a second partial product signal at said output means for transmission through said third circuit means to said accumulator means, said accumulator means including signal controlled adding and subtracting means controlled by said control system whereby said partial products as they are obtained may be either added to or subtracted from the previous number content of the accumulator device under the control of a machine instruction signal.

11. A multiplying arrangement according to claim 10 in which said accumulator device comprises a cathode ray tube type of device having a plurality of separate storage lines each capable of recording a group of $x$ digits, said accumulator having signal-controlled means controlled by said cyclic control means for selectively scanning said storage lines in predetermined different order.

12. In an electronic digital computing machine having a data signal storage system and a control system operated by instruction signals for controlling the operation of the machine as a series of discrete computation steps each under the control of a separate instruction signal, the provision of a multiplying system comprising input means for receiving signals representing the multiplicand and multiplier numbers, a multiplier circuit having multiplicand signal input means, multiplier signal input means and product-representing output means, said multiplier signal input means being limited in capacity to $x$ digits where $x$ is an integral fraction of the maximum number of digits in said multiplier signal, number-signal storage means separate from said data storage system connected to said input means for recording at least said multiplier signal, said storage means including signal controlled read-out means for reproducing at least said multiplier-representing signal in separate sections each of $x$ digits length, first circuit means including first signal-controlled switch means connecting said read-out means to said multiplier signal input means, second circuit means including second signal-controlled switch means connecting said input means to said multiplicand signal input means, accumulator means, third circuit means connecting said product-representing output means to said accumulator means, cyclic control means connected to and operated by said control system in response to a single instruction signal for supplying control signals to said read-out means and said first and second switch means to effect reading out of a first $x$ digit section of said multiplier signal from said storage means to said multiplier input means followed by application of said complete multiplicand signal to said multiplicand input means to produce a first partial product signal at said output means for transmission through said third circuit means to said accumulator means and then reading out of a second $x$ digit section of said multiplier signal from said storage means to said multiplier input means followed by application of said complete multiplicand signal to said multiplicand input means to produce a second partial product signal at said output means for transmission through said third circuit means to said accumulator means, sign-testing means for determining the sign of said multiplicand and said multiplier signals, said sign testing means being controlled by applied sign-test signals to be rendered operative or inoperative as required, sign-test signal generating means controlled by an instruction signal in said control system for providing a control signal to said sign testing means to determine the sign of at least one of said multiplicand and multiplier signals when of signed form and means for modifying the operation of the multiplying arrangement to provide a correct answer representing signal in said accumulator means in dependence upon the determined sign of said tested signal.

13. A multiplying arrangement according to claim 12 which includes circuit means for effecting extension of said multiplicand signal by repetition of its most significant digit value at each of a plurality of digit positions of greater significance value before application to said multiplicand input means.

14. A multiplying arrangement according to claim 13 wherein said signal extending means includes signal-controlled operation-suspending means to allow passage of the applied signal in unaltered form when suspended and a source of control signals for said operation suspending means, said source being controlled by said control system in accordance with a machine instruction.

15. A multiplying arrangement according to claim 14 which includes complementing means for effecting conversion of the multiplicand signal to a signal form which represents the complement of the multiplicand number, said complementing means being controllable by an applied electric signal to be operative or inoperative to effect conversion and when inoperative serving to pass the applied input signal therethrough in unaltered form.

16. A multiplying arrangement according to claim 15 wherein said complementing means is controlled by an electric signal provided by a two-stable state trigger circuit which has previously been set into one or the other of its stable states by an instruction signal and in accordance with a requirement for multiplication of either signed or unsigned number signals.

References Cited in the file of this patent

UNITED STATES PATENTS

| | | |
|---|---|---|
| 2,262,235 | Hofgaard | Nov. 11, 1941 |
| 2,404,047 | Flory | July 16, 1946 |
| 2,429,228 | Herbst | Oct. 21, 1947 |
| 2,587,532 | Schmidt | Feb. 26, 1952 |
| 2,604,262 | Phelps | July 22, 1952 |
| 2,623,115 | Woods-Hill | Dec. 23, 1952 |
| 2,634,052 | Bloch | Apr. 7, 1953 |
| 2,635,229 | Gloess | Apr. 14, 1953 |
| 2,641,407 | Dickinson | June 9, 1953 |
| 2,658,670 | Morton et al. | Nov. 10, 1953 |
| 2,672,283 | Havens | Mar. 16, 1954 |
| 2,685,407 | Robinson | Aug. 3, 1954 |